United States Patent [19]
Wolf et al.

[11] Patent Number: 5,207,107
[45] Date of Patent: May 4, 1993

[54] NON-INTRUSIVE FLOW METER FOR THE LIQUID BASED ON SOLID, LIQUID OR GAS BORNE SOUND

[75] Inventors: Henry A. Wolf, Franklin Lakes; Richard E. Walter, Long Valley, both of N.J.; Linda Hofmann, Baton Rouge, La.; George D. Cody, Princeton, N.J.; Gerald V. Storch, Jr., Bridgewater, N.J.

[73] Assignee: Exxon Research and Engineering Company, Florham Park, N.J.

[21] Appl. No.: 718,477

[22] Filed: Jun. 20, 1991

[51] Int. Cl.$^5$ ............................................. G01F 1/74
[52] U.S. Cl. ............................. 73/861.04; 73/861.18
[58] Field of Search ............ 73/861.04, 861.18, 861.21

[56] References Cited

U.S. PATENT DOCUMENTS

| | | | |
|---|---|---|---|
| 4,884,457 | 12/1989 | Hatton | 73/861.04 |
| 4,905,897 | 3/1990 | Rogers et al. | 73/861.18 X |
| 4,989,158 | 1/1991 | Sloane | 73/664 X |
| 5,031,466 | 7/1991 | Redus | 73/861.04 |

Primary Examiner—Herbert Goldstein
Assistant Examiner—Elizabeth L. Shopbell
Attorney, Agent, or Firm—Ronald D. Hantman

[57] ABSTRACT

A method for measuring the mass flow rate of liquid flow exiting a two phase (gas/liquid) feed nozzle. The method includes determining the Power Spectral Density from the output of an accelerometer in close proximity to the restriction orifice controlling the gas flow, or determining the Power Spectral Density from the output of a pressure transducer in contact with the gas flow on the down stream side of the restriction orifice. The liquid flow can then be obtained from a predetermined correlation between the RMS Vibrational Signal and the mass or liquid flow rate.

9 Claims, 20 Drawing Sheets

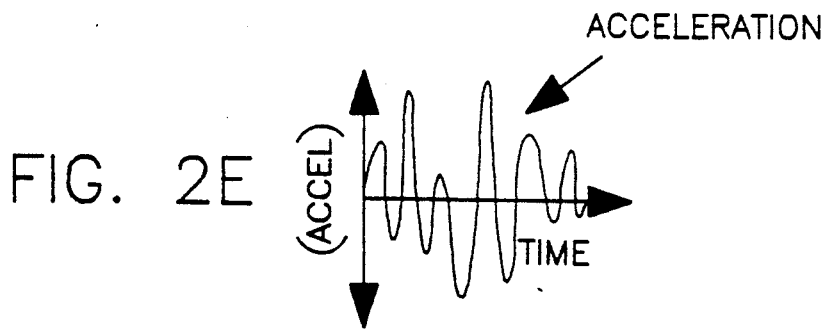
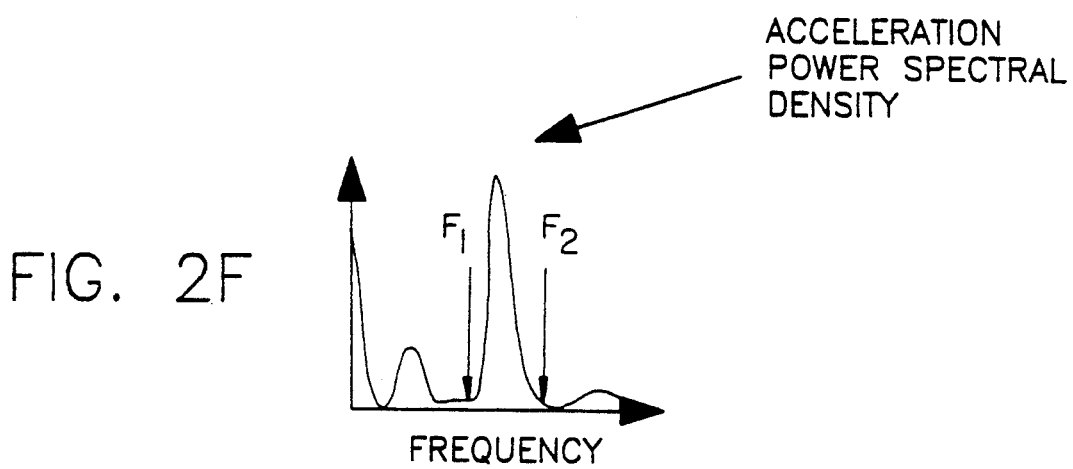
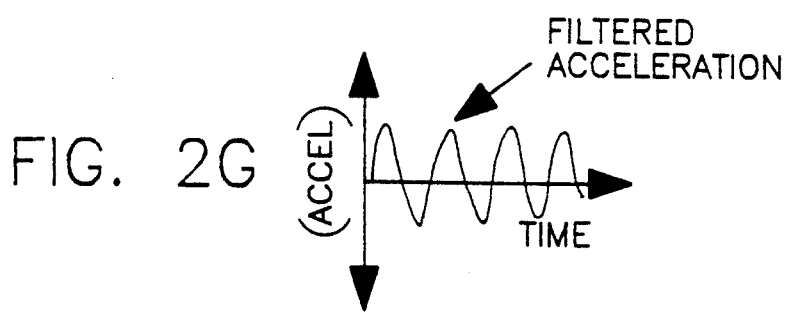
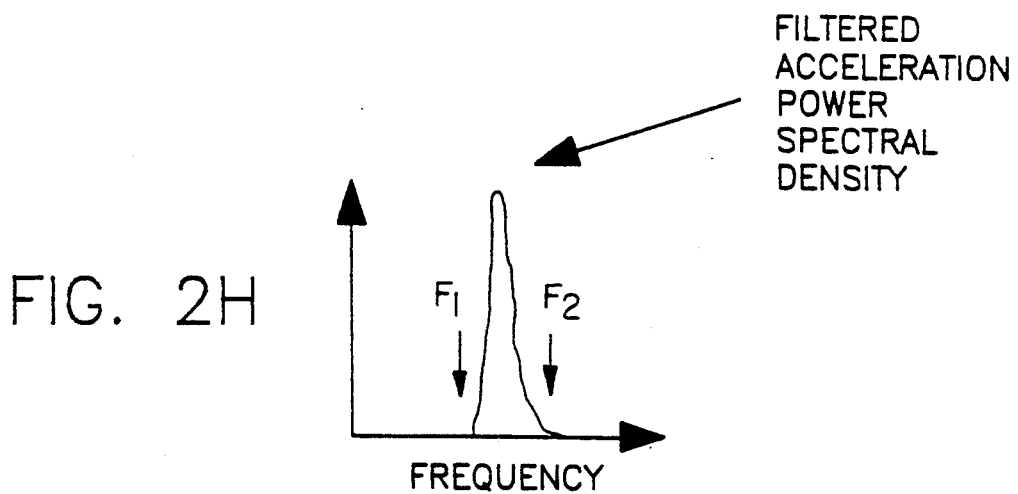

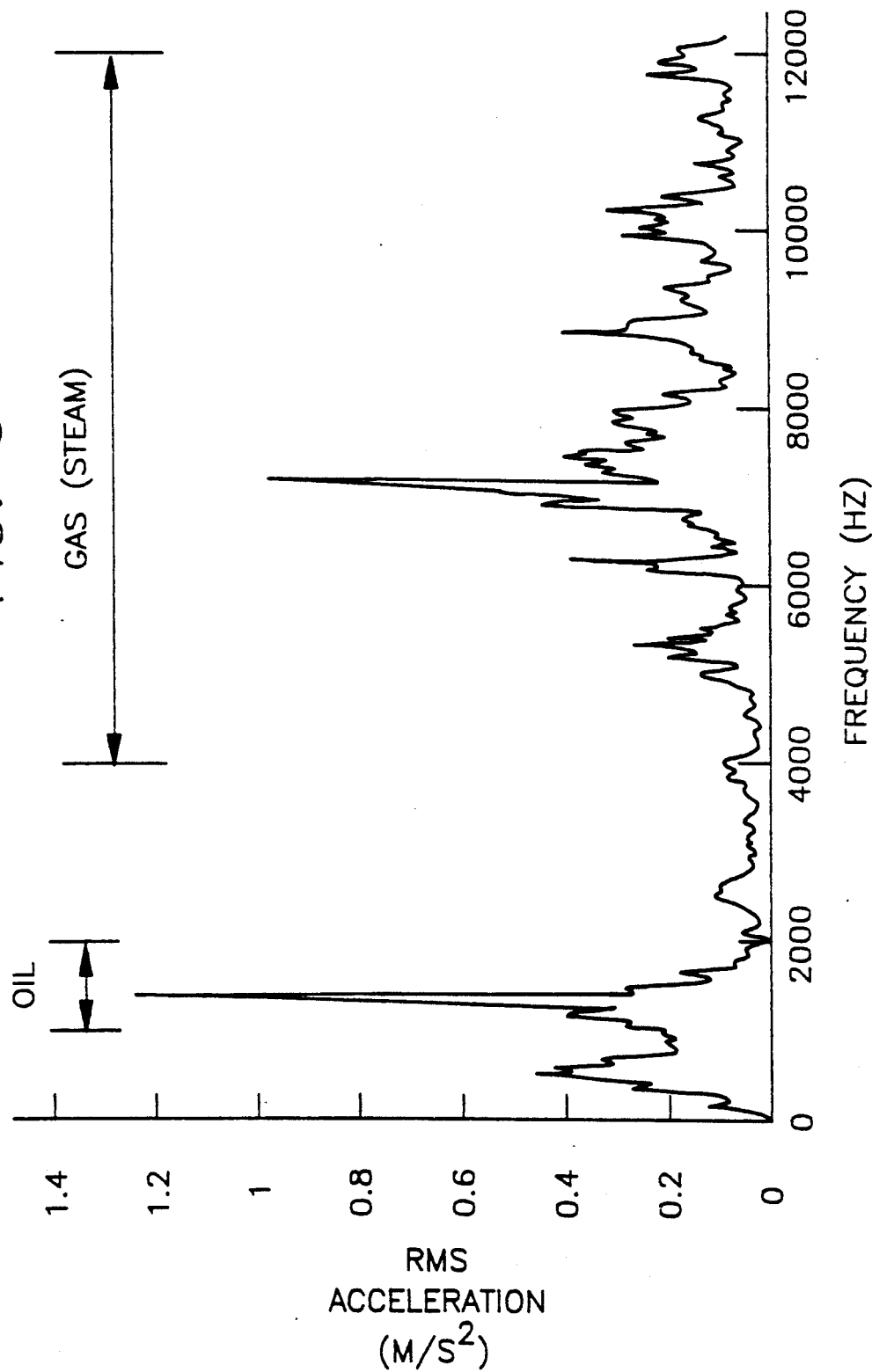

FIG. 5A
SHEET 1 OF 2
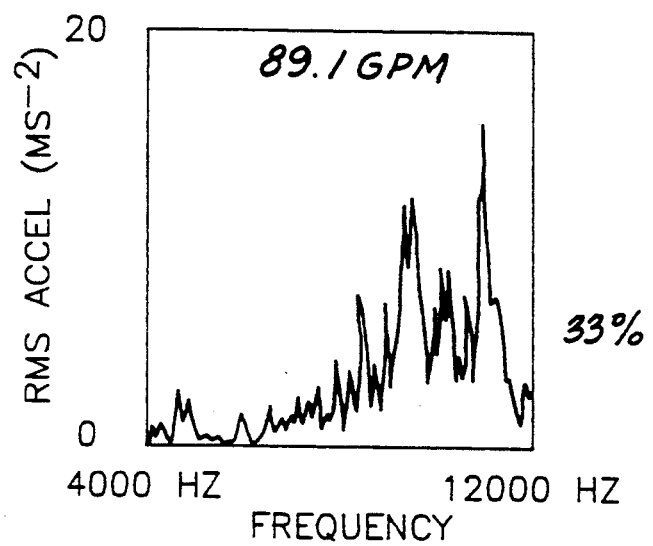
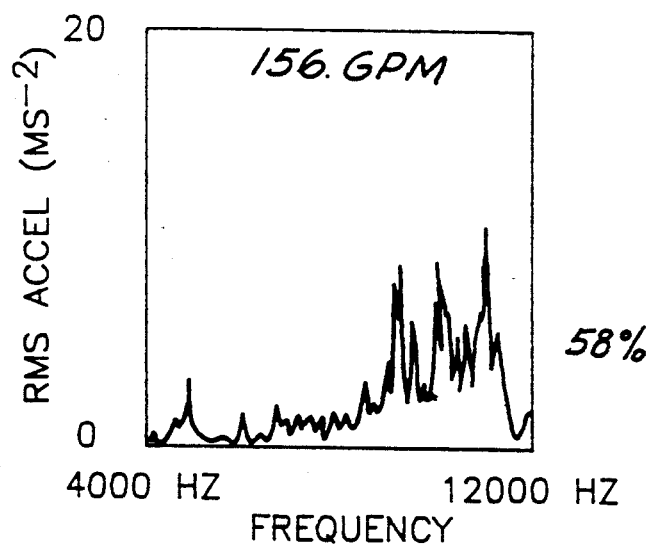

FIG. 5A
SHEET 2 OF 2
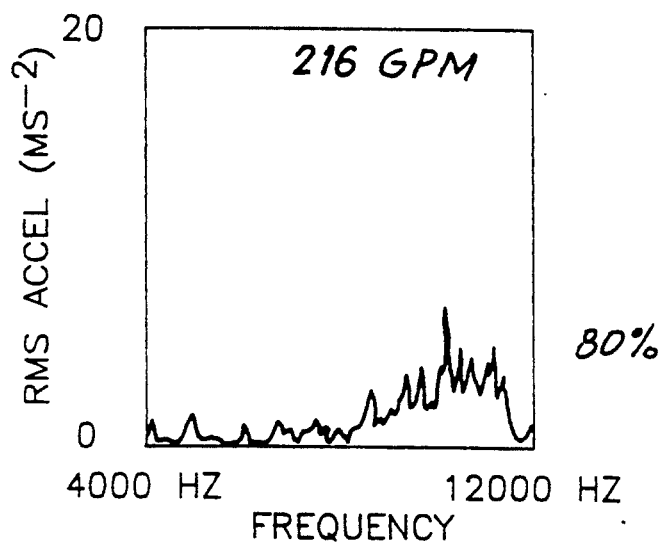
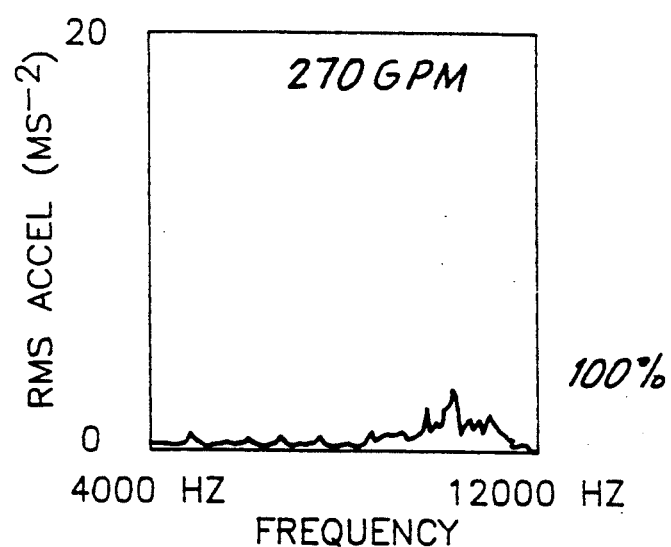

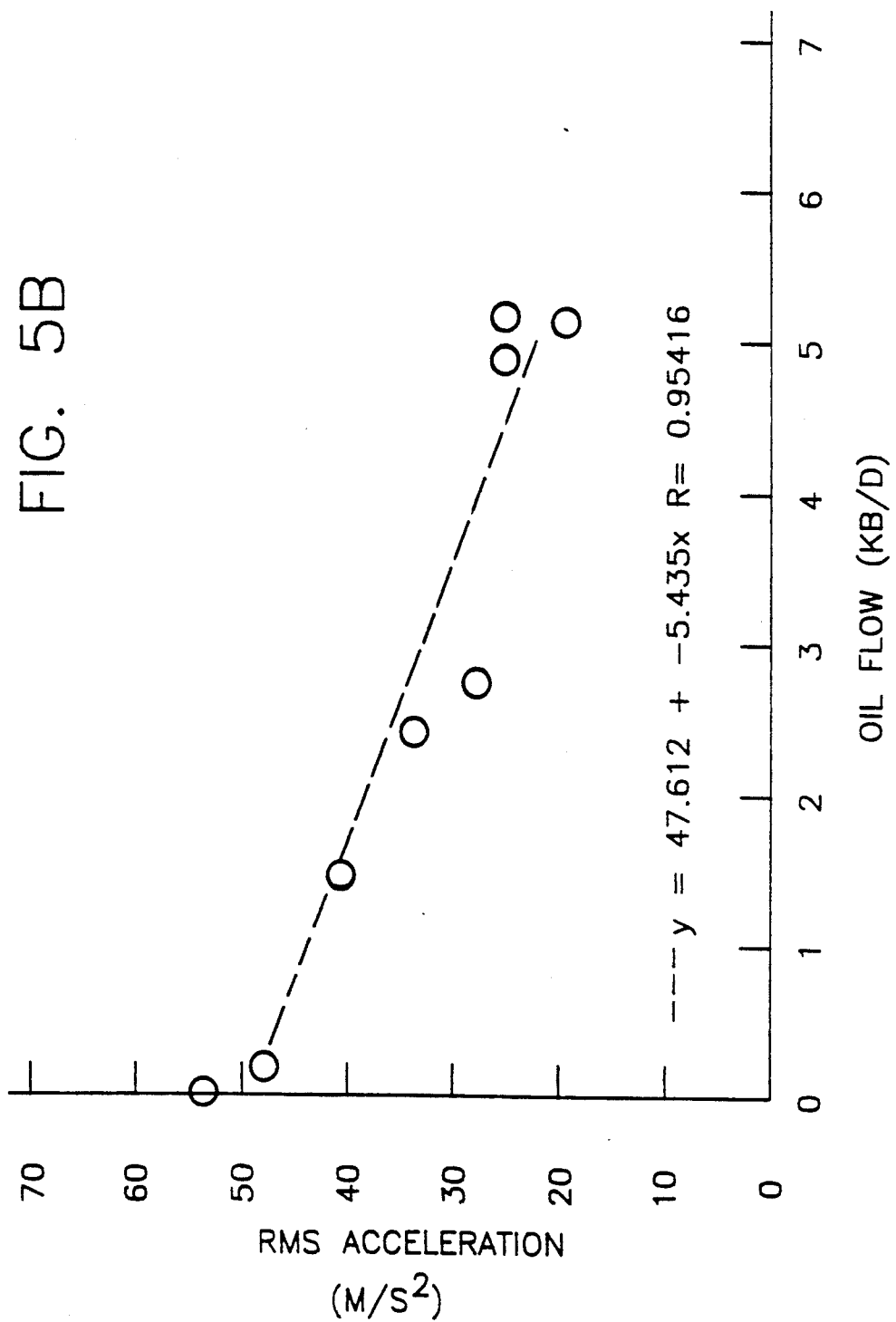

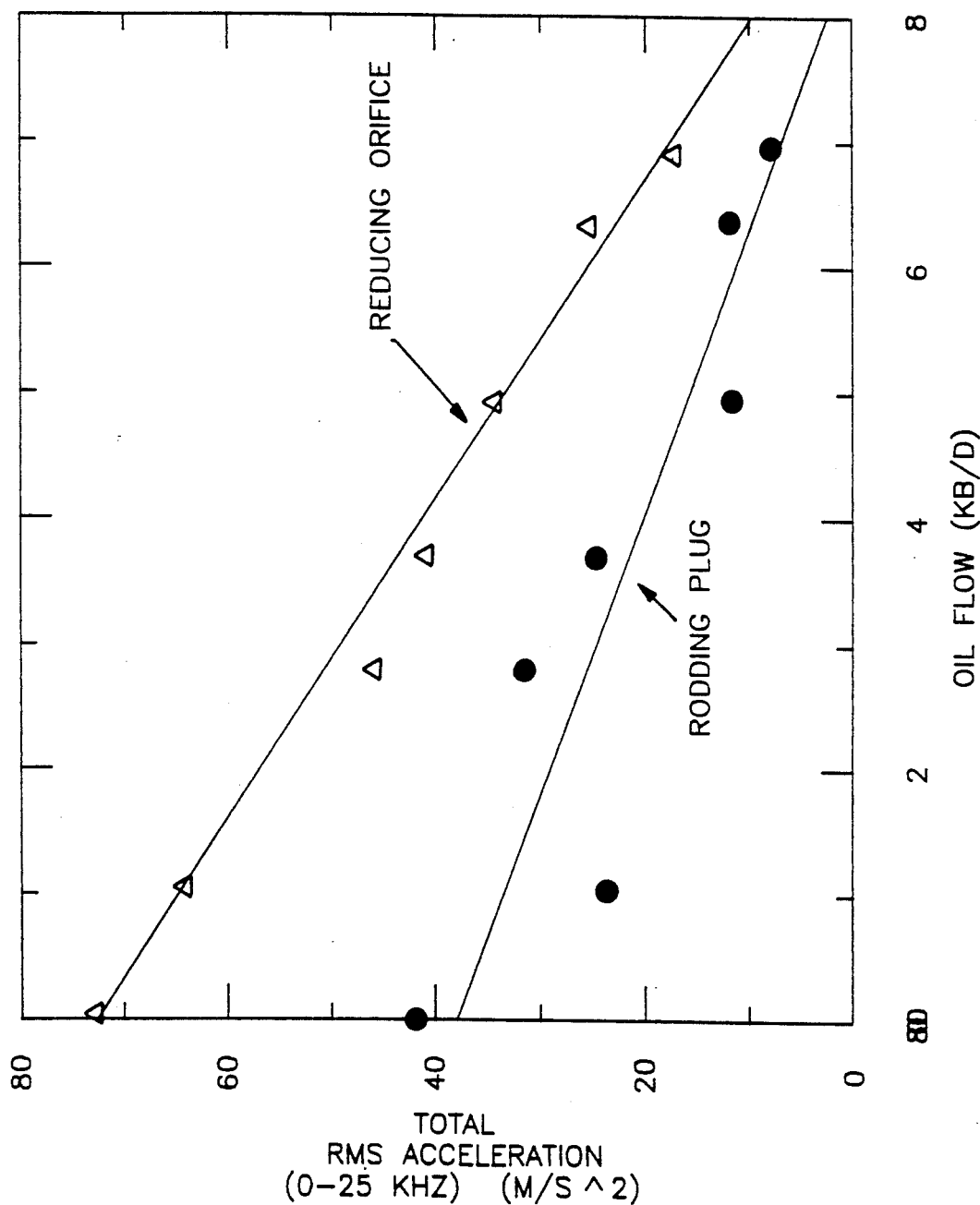

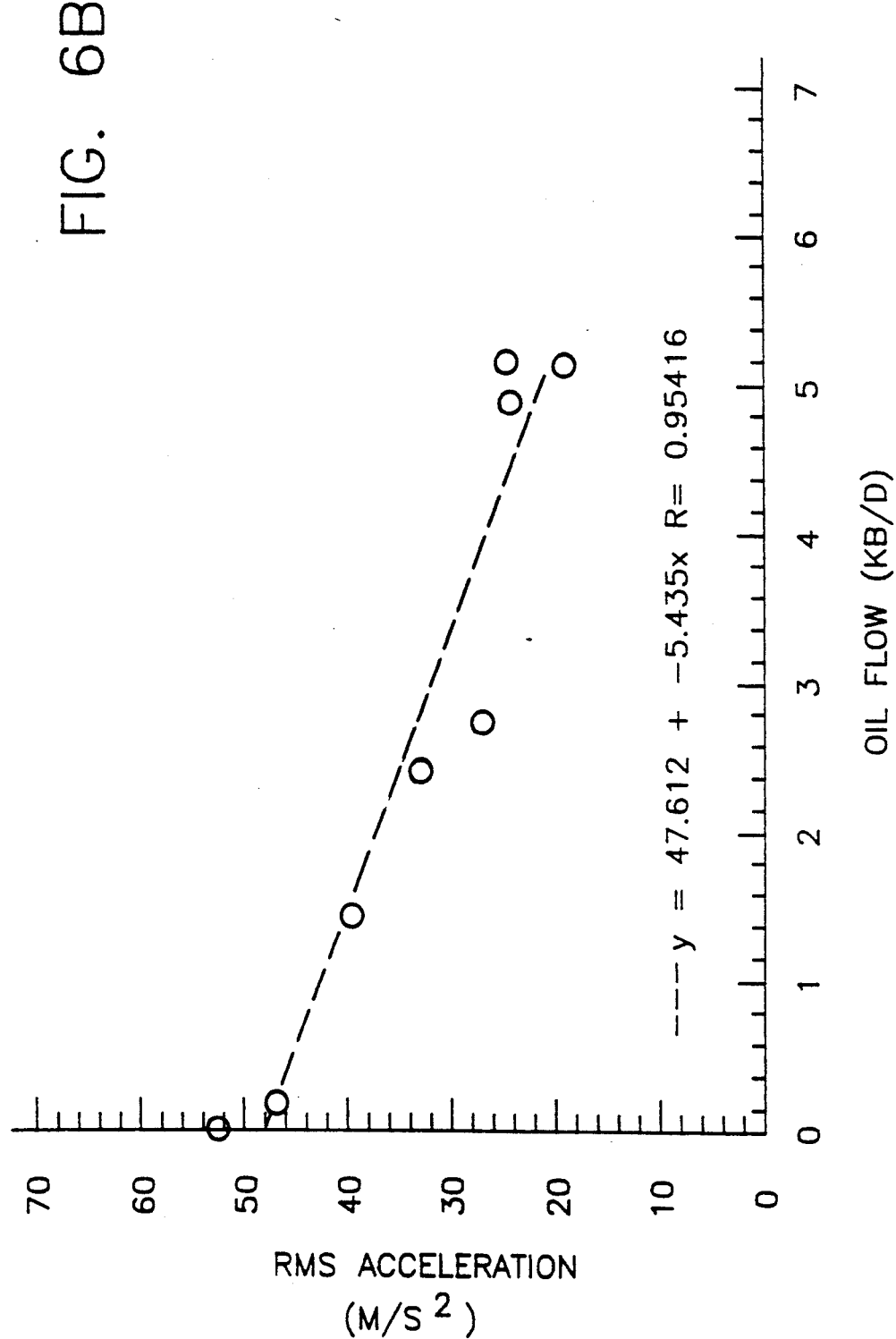

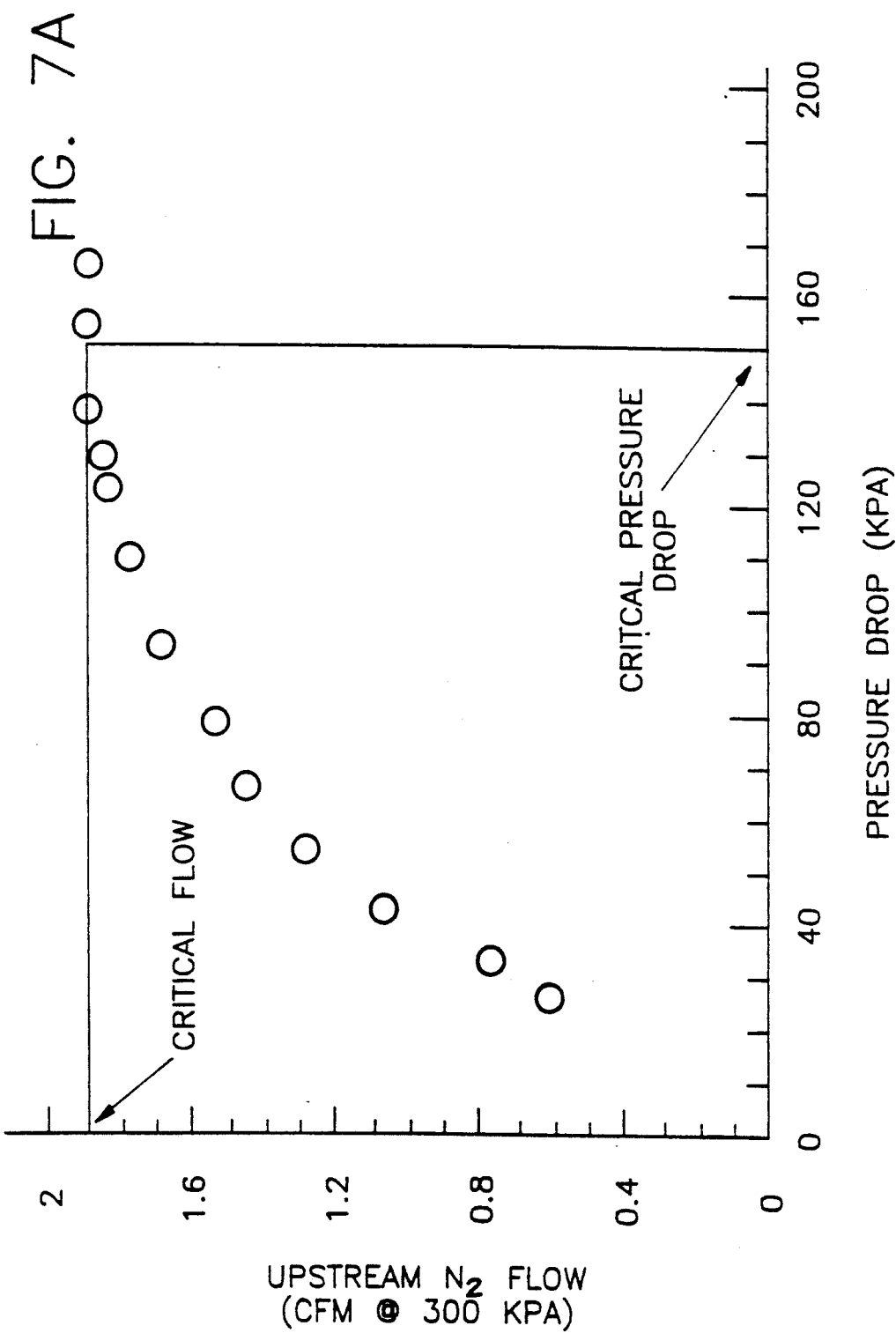

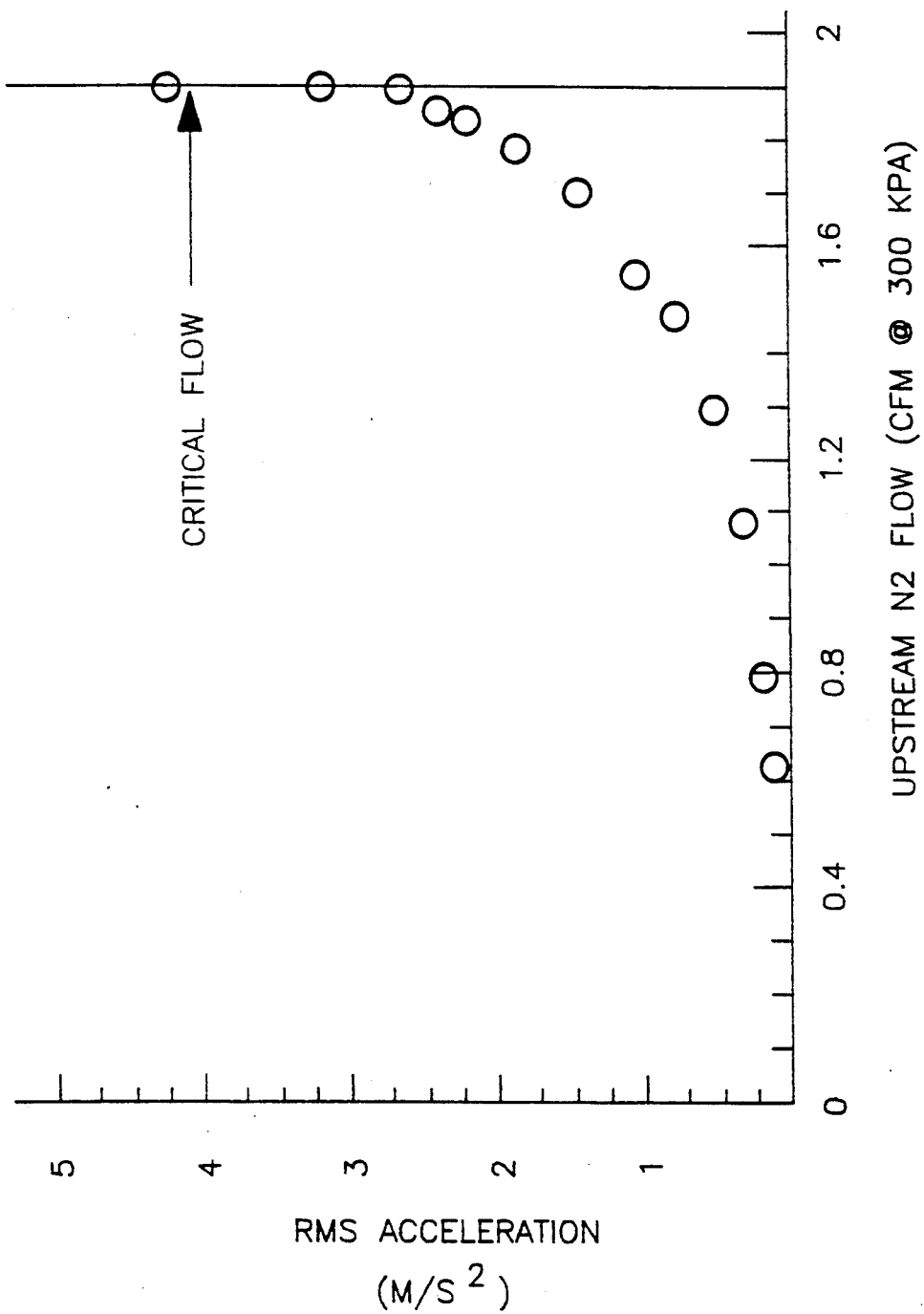

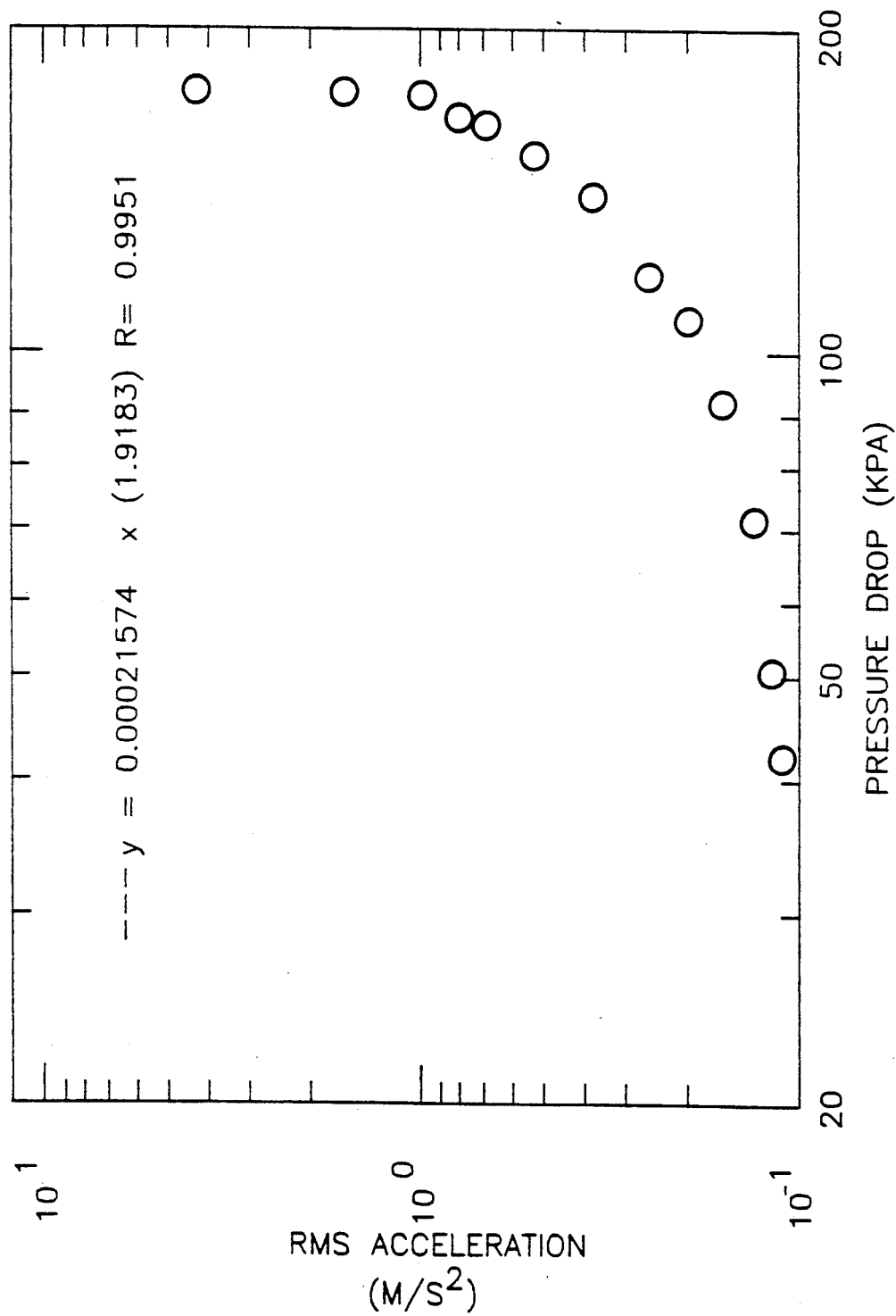

NON-INTRUSIVE FLOW METER FOR THE LIQUID BASED ON SOLID, LIQUID OR GAS BORNE SOUND

BACKGROUND OF THE INVENTION

The present invention describes a method for measuring the mass flow rate of liquid flow in a two phase (gas/liquid) feed nozzle.

Two phase nozzles are important for a variety of applications particularly for the injection of atomized feed in chemical or petroleum processing operations. In many such processes, operability or selectivity improvements result when an atomized hydrocarbon liquid is sprayed in a controlled and measured manner into a reaction zone, particularly when a process catalyst is involved. One example is the process of fluidized catalytic cracking (FCC) of higher boiling petroleum fractions. Typically, a high degree of feed atomization is achieved by mixing the liquid feed with a gas and injecting the mixture into the process from a feed nozzle designed to produce finely dispersed drops. In catalytic cracking, steam is typically used as the atomizing gas, but any process compatible gas may be used.

The need to control and measure the distribution of the atomized liquid sprayed into a process vessel is normally satisfied by using multiple services or nozzles. Maintaining the proper mixture of liquid to gas for atomization, and ensuring that each nozzle carries a specified liquid or mass flow, enables potential unit operating advantages. One common operating mode is to maintain equal liquid flow in each nozzle. Most installations which have multiple feed nozzles usually include block valves or restriction orifices on the liquid and gas lines to an individual nozzle, but these do not uniquely determine the liquid flow. When nozzles are fed from a common manifold, there is thus no assurance that the liquid flow through each nozzle is optimized since only the net liquid flow to the total manifold can be readily measured. In fact, measurement of various manifolded nozzle flows has usually shown significant deviations from equal liquid flow to each nozzle. In contrast, the gas flow to a nozzle is usually determined by a restriction orifice on the gas line which ensures relatively uniform gas distribution to the individual nozzles.

Measuring mass flow of a liquid is not new. There are a variety of flow meters that have been used to measure mass flow. Some of them are mechanical in nature utilizing the force of a moving liquid to turn a wheel or deflect a needle. Such flow meters can only measure mass flow in single phase conditions and are usually restricted to non-fouling liquids. Those flow meters available for the single phase flows common to the petroleum and petrochemical industry tend to be quite costly. The very high temperatures that are maintained to reduce flow viscosity impose yet other complications. Furthermore, the service liquids readily foul and clog, the mechanical components of such flow meters.

There are a variety of flow meters known as "vortex flow meters" that utilize vortex wakes proceedings from obstacles placed in the flow to measure the velocity of the flow from the frequency of vortex shedding. Such flow meters are again limited to single phase flow. Again, they require placement of an obstacle in the flow, and hence are again prone to fouling. The temperature range of most systems is narrow due to fundamental restrictions on the sonic transducers required to pick up the sound generated by the obstacle.

There are a variety of acoustic flow meters that utilize ultrasonics to measure flow. A class of such flow meters utilizes an ultrasonic transducer/receiver attached to the pipe containing the moving fluid, and an ultrasonic receiver/transducer attached to the same pipe up stream and/or down stream of each other. The high operating temperature of many petroleum and petrochemical process, as well as geometrical constraints on the attachment of the active acoustic device makes these flow meters expensive and difficult to apply in many petroleum and petrochemical applications. The operating temperatures often exceed the operating limits of many single phase flow meters.

Measurement of the liquid fraction of a gas/liquid mixture flowing through two phase nozzles is difficult. Usual devices for flow measurement are sensitive only to the velocity of the flow or its pressure and not to mass flow. Hence, such devices are incapable of measuring liquid flow without separate and equally complex measurements of the density of the mixture. Devices that are capable of measuring single phase liquid flow are expensive and are often intrusive since they require the insertion of an orifice or barrier in the flow which can be easily fouled by the liquid portion of the mixture. Since in most petroleum and petrochemical applications, the two phase mixture is maintained at an elevated temperature to achieve a sufficiently low viscosity for flow, there is a temperature limitation on flow measurement devices as well.

Thus most petroleum and petrochemical installations do not meter flows to each feed nozzle because suitable and easily maintained flow meters are expensive due to the severity of process conditions and pipe geometry limitations. The development of specialized flow meters to meet such stringent conditions would require significant expense and undesired complexity.

Although petroleum and petrochemical processing units may demonstrate improved operation with specified liquid distribution from manifolded feed nozzles, only the net liquid flow to the manifold is usually measured or controlled. However, without a measuring scheme the probability of a desired flow distribution among feed nozzles is small due to the complex nature of the two phase fluid exiting the nozzle. Uncertainties in liquid distribution are compounded by the possibility that a portion of the liquid feed could be vaporized.

The existence of such flow imbalance is usually inferred only by anomalous process conditions or from changes in unit output yields over an extended period of time. Furthermore, feed nozzles can partially plug or erode leading to significant flow maldistributions which can remain undetermined until the unit is shut down for maintenance. There is thus a need for a technique that can measure and monitor the liquid flow from an individual nozzle.

This invention teaches a method for determining the mass flow rate of the liquid feed in individual two phase (gas/liquid) feed services It shows how this can be done passively and non-intrusively with respect to the flow by either (1) using a pressure transducer in acoustic contact with the downstream side of the restriction orifice (RO) controlling the gas contribution to the two phase (gas/liquid) flow; or (2) using an accelerometrs or other vibrational sensor in contact with the solid borne sound proceeding from the restriction orifice (RO) controlling the gas contribution to the two phase (gas/liquid) flow.

The term "non-intrusively" is used to mean that the sensor does not penetrate into the flow although it may be permanently installed approximately flush with the surface of the pipe interior. That is, the sensor is not disruptive to the flow.

From the method taught in this invention, liquid flow rate can be measured and monitored in real time for a wide degree of liquid/gas atomization conditions in individual feed services or nozzles. Since the method measures quantities related to the mass of the flowing fluid it is a widely applicable technique for many categories of two-phase fluid sprayers. Since it depends only upon the vibration and resonances inherent in the flowing systems and piping, it can be applied rapidly and with ease in a variety of systems. Since the output of the method taught is electronic in nature it is easily transmitted to a control system and the method can be used to automatically measure and control the feed atomization and feed flow through individual nozzles fed off a common manifold.

SUMMARY OF THE INVENTION

The present invention is a method for measuring the mass flow rate of liquid flow exiting a two phase (gas/liquid) feed nozzle. The present invention can also be expressed as a method for measuring liquid volumetric flow since the flow rate of liquid mass and volume are related by the nearly constant liquid density. For convenience in what follows, the term "mass flow" shall be used to designate both liquid mass flow and liquid volumetric flow.

The method includes determining the Power Spectrum from the output of an accelerometer in close proximity to the restriction orifice (RO) controlling the gas flow, or determining the Power Spectral Density from the output of a pressure transducer in contact with the gas flow on the down stream side of the restriction orifice (RO). The area of a band of frequencies within the power spectral density of either vibrational sensor from 0 to 20 kilohertz is identified which includes reference peaks whose magnitude is inversely proportional to the liquid flow through the nozzle. In what follows these peaks will be designated, Gas Flow Peaks or GFP. It is usually found experimentally that the GFP are found at relatively high frequencies and usually between 3,000 and 20,000 Hz. The square root of the area of the power spectral density in a frequency band that includes the GFP is designated the AGFP and determines the Root Mean Square Vibrational Signal (RMS Acceleration or RMS Pressure) over this band. The AGFP is a number which has been found to vary inversely with the liquid flow through the nozzle in question The liquid flow can then be obtained from a predetermined correlation between the RMS Vibrational Signal (AGFP) and the mass or liquid flow rate. From this correlation the liquid or mass flow rate is determined at the time of measurement of the vibrational Power Spectrum. In order to practice the invention, it is not necessary to insert a mechanical element in the two phase flow within the nozzle. The invention is thus a non-intrusive measurement of mass or liquid flow, Acoustic contact with either gas, liquid or solid born sound is all that is required. One of the advantages of the present invention is that the method does not depend on nozzle geometry, working equally well for nozzles that achieve gas/liquid mixing by either having mixing vanes or flow restriction.

The Power Spectrum of the vibrational sensor is defined as the distribution in frequency of the square of the output of the vibrational sensor (the Power Spectral Density). The Power Spectral Density has the units in this invention of either acceleration squared per unit frequency (Hertz) or pressure squared per Hertz (Hz). The power spectrum has the property that the area of the power spectral density over any frequency range is equal to the mean square of the output of the vibrational sensor: for this invention the area of the Power Spectral Density is either the mean square acceleration or the mean square pressure. The power spectrum as a plot of the Power Spectral Density as a function of frequency is most simply obtained by passing the output of the vibrational sensor into a digital signal processor (Bruel and Kjaer 2032 or similar). Under these circumstances it is often convenient to display in figures, the RMS Pressure or Acceleration Spectrum, which is proportional to the square root of the Pressure or Acceleration Power Spectral Density. It is also often convenient to plot the square root of the area of the Power Spectrum of the vibrational sensor as the RMS Acceleration or RMS Pressure over a band of frequencies.

BRIEF DESCRIPTION OF THE DRAWINGS

FIGS. 2a, 2b, 2c, 2d, 2e, 2f, 2g, and 2h illustrate the conversion of an unfiltered and filtered time varying acceleration (pressure) to an Acceleration (Pressure) Power Spectrum or to a RMS Power Spectrum For specificity, the vibrational sensor in FIG. 2 is taken to be an acceleration sensor; a dynamic pressure sensor would do as well.

FIG. 2a shows a typical Acceleration signal as a function of time. FIG. 2b shows the square of the Acceleration signal of FIG. 2a. FIG. 2c shows the Acceleration Power Spectrum of the signal shown in FIG. 2a. The Acceleration Power Spectrum displays Acceleration Power Spectral Density as a function of frequency. The integral of the Acceleration Power Spectral Density over all the frequencies contained in the Acceleration signal shown in FIG. 2a is equal to the time average of the square of the Acceleration signal shown in FIG. 2b. FIG. 2d shows the RMS Acceleration Spectrum which is proportional to the square root of the Acceleration Power Spectral Density shown in FIG. 2c.

FIG. 2e shows another typical Acceleration signal as a function of time. FIG. 2f shows the Acceleration Power Spectrum of the signal shown in FIG. 2e. The Acceleration Power Spectrum displays Acceleration Power Spectral Density as function of frequency. The integral of the Acceleration Power Spectral Density between the frequencies, $F_1$ and $F_2$, indicated on FIG. 2f is defined as the area of the indicated peak. It is equal to the mean squared power of the acceleration time signal for the band of frequencies between $F_1$ and $F_2$.

FIG. 2g shows the Acceleration signal of FIG. 2f that has been passed through a filter device that reproduces the signal for frequencies, F, inside a pass band $F_1 < F < F_2$ and strongly attenuates the signal outside that band.

FIG. 2h shows the Acceleration Power Spectrum of the filtered signal shown in FIG. 2g. The Acceleration Power Spectrum displays the Acceleration Power Spectral Density as function of frequency. The integral of the Acceleration Power Spectral Density over all the frequencies contained in the Acceleration signal shown in FIG. 2g is equal to the time average of the square of the acceleration signal shown in FIG. 2g.

FIG. 3 shows the RMS Acceleration Spectrum from an accelerometer mounted on the rodding plug (FIG. 1D) of a feed nozzle injecting oil and steam into the feed riser of a FCC unit. The region of the spectrum for this nozzle containing the "Liquid Flow Peaks (LFP)" (0–4000 Hz) which increase with increasing oil flow, and the "Gas Flow Peaks (GFP)" (4,000–12,800 Hz) which decrease with increasing oil flow are approximately indicated. Precise identification of these peaks, and the regions of the RMS Acceleration Spectrum where they are found, is based on field calibration.

FIG. 5a shows a suite of RMS acceleration spectra over the band 4–12 kHz from a cat-cracking feed nozzle. The vibrational data was taken from an accelerometer on the face of the flange holding the restriction orifice (RO) (at Location 25 of FIG. 7D). In this configuration, the gas (steam) peaks dominate the power spectrum. The decrease in gas (steam) peaks with increasing oil flow is apparent.

FIG. 5b shows RMS Acceleration taken over the band 0–15 kHz (AGFP) of the full power spectrum function of the oil flow for this nozzle.

FIG. 6a shows RMS acceleration over the band 0–25.6 kHz taken from an accelerometer placed on either the rodding plug (Location 26 of FIG. D) or on the edge of the steam RO (Location 25 of FIG. D) for nozzle S-16 indicating sensor locations with good sensitivity to mass or liquid flow.

FIG. 6b shows the vibrational signal (RMS Acceleration) from the edge of the RO Location 25 of FIG. 1D over the band 0–15 kHz for another feed nozzle indicating a sensor location with relatively good sensitivity to mass or liquid flow.

FIG. 7a shows the measured gas volume (mass) flow, in standard cubic feet per minute (CFM), through a restriction orifice (RO) under "choked flow" conditions as a function of pressure drop across the RO as determined laboratory experiments. The pressure is measured in units of 1000 of Pascals (kPA).

FIG. 7b shows the RMS Acceleration taken from the power spectrum of an accelerometer on the RO over the band 13–17 kHz as a function of measured gas volume (mass) flow (CFM) through the RO under the conditions of FIG. 7a.

FIG. 7d shows the RMS Acceleration taken from the power spectrum of an accelerometer on the RO over the band 13–17 kHz as a function of pressure drop across the RO under the conditions of FIG. 7a.

DESCRIPTION OF THE PREFERRED EMBODIMENT

The present invention is a method for non-intrusively measuring and monitoring the liquid (mass) flow rate exiting a two phase (gas/liquid) nozzle where the gas flow into the nozzle is controlled by a restriction orifice (RO). The method consists of measuring the vibrational signal generated by the gas flowing through the RO which has been discovered to vary inversely with the mass flow rate of liquid exiting the nozzle. In one embodiment of the invention, the vibrational signal is measured by an accelerometer placed in contact, through solid borne sound, with the sound energy generated by the gas flow through the RO. In another embodiment of the invention the vibrational signal is measured by a dynamic pressure gauge in gas or liquid contact with the sound energy generated by the gas flow through the RO.

In both embodiments, the time varying electrical signal from either of these sensors is amplified and then either recorded for subsequent processing or processed directly into a power spectrum. This power spectrum displays the computed frequency content of the sound energy or acoustic noise generated within the RO (Power Spectral Density) A general description of the electronic system by which the acoustic noise signal is correlated with liquid flow is given in what follows. Two phase feed nozzles of a fluidized catalytic cracking reactor (cat cracker) are often used for illustrative purposes, but this invention is not restricted to this use.

Figure 1A:
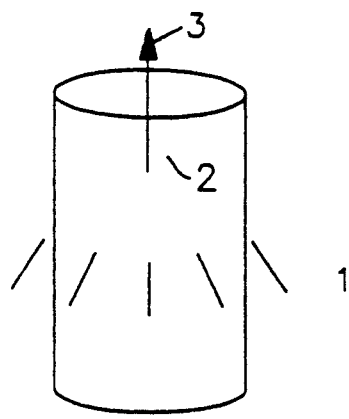
FIG. 1A shows a schematic of the feed injection zone on a fluidized catalytic cracking unit (FCC unit) indicating the placement of the feed nozzles.
Figure 1B:
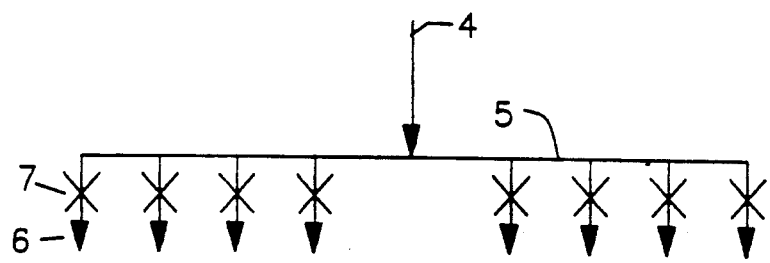
FIG. 1B shows the oil manifold supplying oil to an individual feed nozzle with oil block valves indicated (7).
Figure 1C:
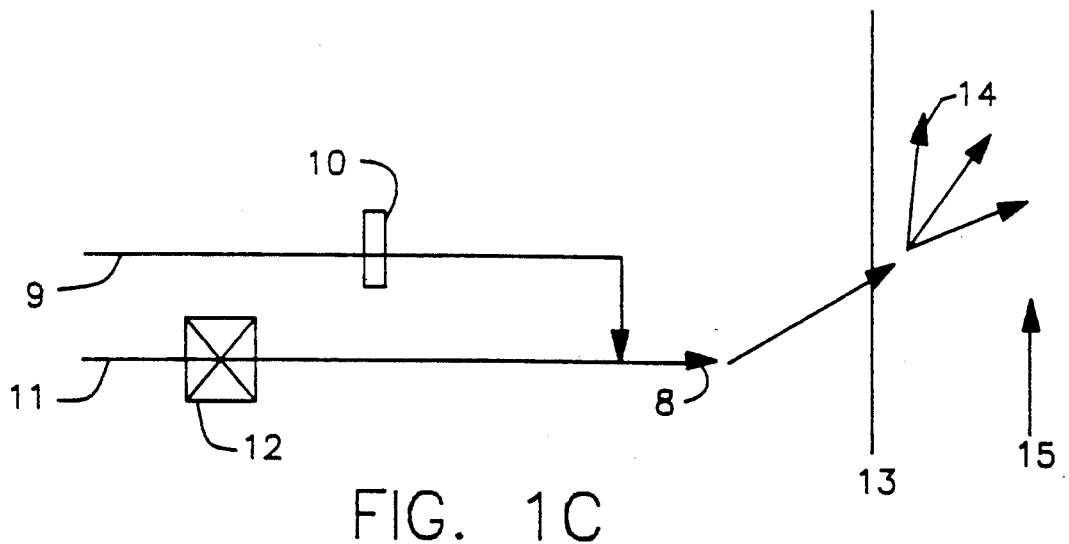
FIG. 1C shows the flow connections to an individual feed nozzle where the steam flow is determined through a restriction orifice (RO) (10) and where the oil flow is determined by a block valve (12).

FIG. 1A is a schematic of the injection region of a typical fluidized catalytic cracking unit (FCC unit) showing the location of eight (for this example) feed nozzles (1) injecting into feed riser (2) with catalyst flow (3) indicated. Oil to the feed nozzles is distributed from header (4) to a common manifold (5) as shown in FIG. 1B. As indicated in the figure, individual block valves (7) in each line control the oil flow to the nozzle (6). As shown in FIG. 1C, steam (9) and oil (11) are fed to an individual nozzle; where the steam serves the dual purpose of atomizing the oil and keeping the nozzle unplugged when the oil is off. Oil flow is controlled by the block valves (12) as indicated in FIG. 1C; steam flow is controlled by having the high pressure steam flow through a restriction orifice (RO) (10) which typically under conditions of "choke flow" maintains a constant mass flow of steam independent of the downstream pressure. The pressure upstream of the RO typically remains constant. The nozzle protrudes into feed riser wall (13) to disperse atomized oil (14), into catalyst flow (15).

Figure 1D:
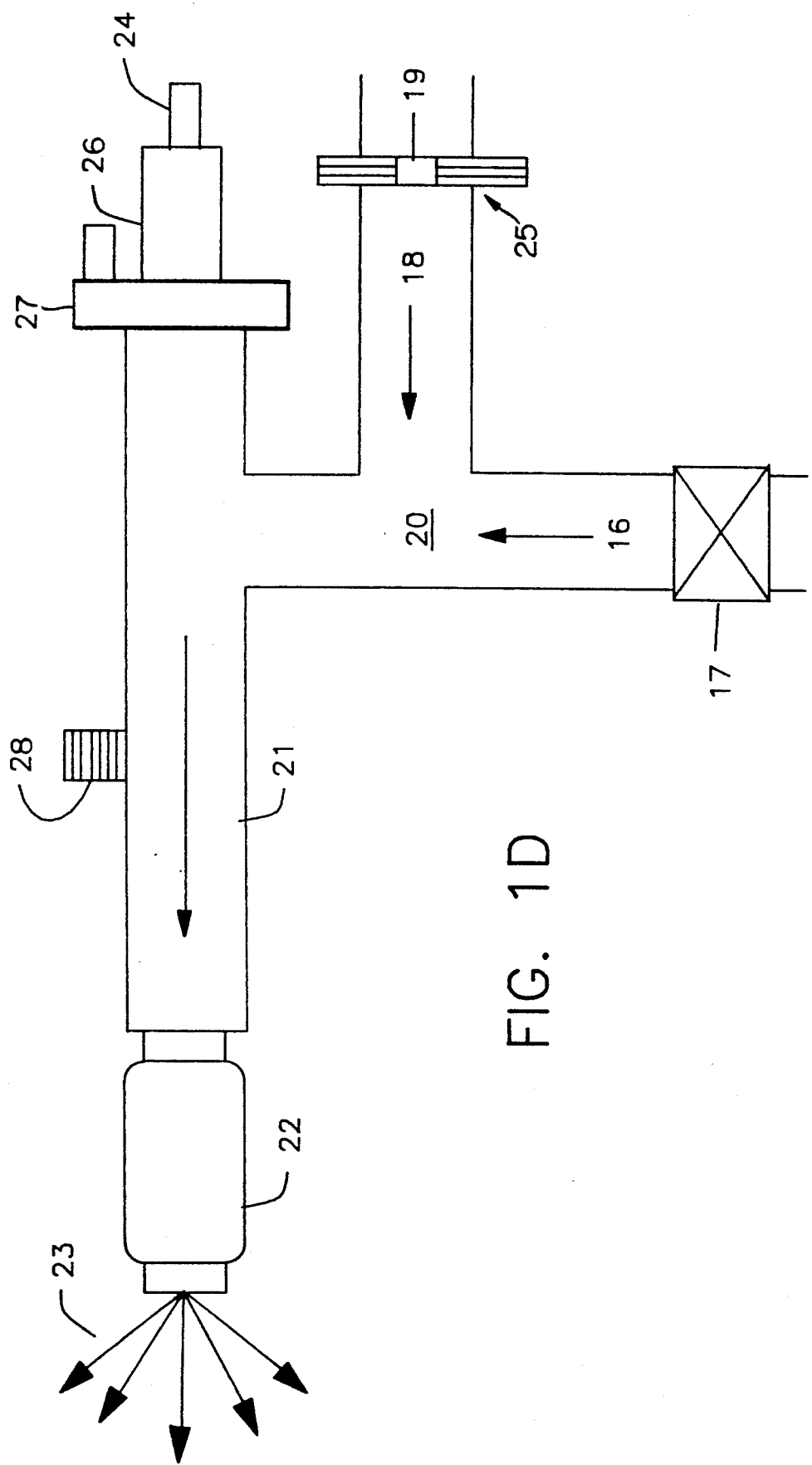
FIG. 1D illustrates suitable locations for the pressure transducer which should be in acoustic contact with the gas down stream of the restriction orifice (RO) and the accelerometer which should be mounted such that it is sensitive to the solid borne sound emitted by the flow through the RO. The accelerometer may be located on the face or edge of the flange in which the RO is held (25), or in any convenient point on the feed nozzle such as the rodding plug (26) or nozzle flange (27).

FIG. 1D shows an individual feed nozzle plumbing in more detail. Oil (16) flowing though block valve (17) mixes with steam (18) controlled by RO (19). The oil/-steam mix point (20) is located downstream of both the oil valve and RO. The mixture is pushed through nozzle barrel (21) to nozzle tip (22) and exits as a spray (23) from the nozzle tip.

In one embodiment of the invention, a vibrational sensor (24) is placed on or adjacent to the flange (25) supporting the RO (19) or in any location in direct contact with the RO-generated sound and vibration. Any location where the accelerometer is sensitive to the changes in the flow noise generated by the RO is acceptable including the RO (19), rodding plug (26) or rodding plug flange (27). In another embodiment of the invention, a dynamic pressure transducer (28) is located to be in contact with the flow downstream of the RO or the oil/steam mix point. Any location where the transducer is sensitive to changes in the flow rate is acceptable.

Figure 2A:
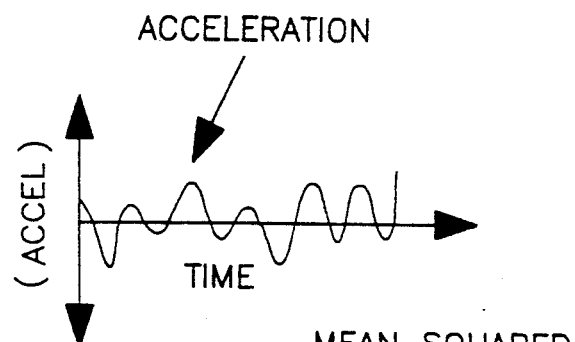
Figure 2B:
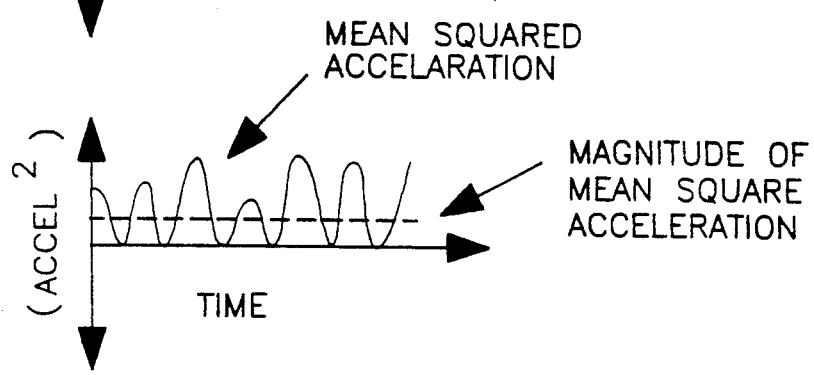

The magnitude of the time dependent electrical signal from the accelerometer, or dynamic pressure transducer illustrated in FIGS. 2a and 2e, is proportional to the vibrational power of the surface of the feed nozzle (accelerometer) and/or to the fluid within (dynamic pressure transducer). Quantitatively, the average of the square of this signal over a time interval is proportional to the Mean Square Power over that time interval. This quantity is one measure of the vibrational energy being produced by the turbulent flow exiting the nozzle as shown in FIG. 2b. In what follows we will sometimes refer to the output of either the accelerometer or dynamic pressure signal as the "vibrational signal" and the square of the output of either the accelerometer or the dynamic pressure transducer as the "vibrational power".

Figure 2C:
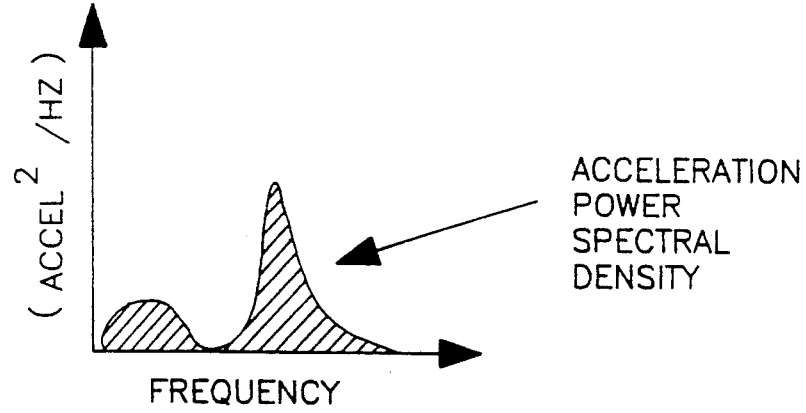

The present invention utilizes another measure of the vibrational power—namely the distribution of vibrational power over frequency. As is well known, the distribution of vibrational power is given by the Power Spectrum of the vibrational sensor which is a plot of the Power Spectral Density as a function of frequency. FIG. 2c shows the Power Spectrum of the time varying random signal of FIG. 2a. The area of the Power Spectrum density over any frequency range is proportional to the mean square vibrational energy of the time varying signal in that frequency range (FIG. 2b). The power spectral density for an accelerometer (dynamic pressure transducer) has the units of acceleration squared per hertz (pressure squared per hertz).

Figure 2D:
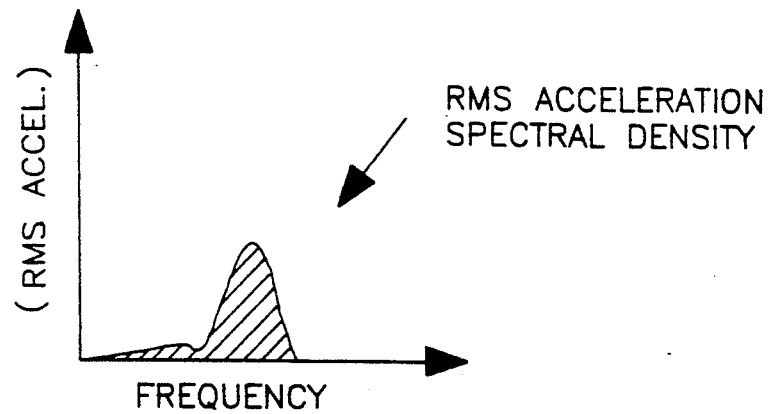

It is often more convenient to display the RMS Power Spectrum where the RMS Spectral Density is plotted as a function of frequency as shown in FIG. 2d. RMS stands for "Root Mean Square". The RMS Power Spectral Density for an accelerometer (dynamic pressure transducer) has the units of RMS acceleration (RMS pressure). Within a constant factor the RMS acceleration (or pressure) is equal to the square root of the power spectrum for acceleration or pressure. As is well known to those skilled in the art of digital signal processing, the proportionality factor between the Power Spectrum of the acceleration (pressure) and the RMS acceleration (pressure) spectrum is the square root of the frequency resolution of the signal processor.

The electrical output for both acceleration and pressure vibrational sensors is converted from a function of time to one of frequency by means of a digital signal processor or equivalent technique The Power Spectrum displays the power of the signal as a function of frequency and has the unique property that the area of the power spectrum density over a frequency band is proportional to vibrational power in that frequency band.

This invention describes a liquid flow meter for a nozzle injecting a two phase (gas/liquid) stream into a reactor based on the discovery that the vibrational power in certain regions of the Power Spectrum can be used to measure the liquid flow exiting the two phase nozzle. In some cases the method of measuring the flow utilizes the power in a specific peak in the Power Spectrum; in other cases, it can be shown that the power of a band of frequencies in the Power Spectrum, including such peaks, can also be a measure of the liquid flow exiting the nozzle.

There are alternative signal processing techniques that may have significant cost or performance advantages over computing the entire Power Spectrum. For example, once the above band of frequencies has been identified, the energy content of the band can be determined in a variety of ways. Digital (or other) band pass filtering of the signal from the vibrational sensor followed by power detection is equivalent to measuring the area of the Power Spectrum over a selected bandwidth. The specific signal processing technique by which the energy content of the vibrational signals over a band of frequencies is determined is not critical as long as the frequency range includes peaks or series of peaks whose area is a sensitive function of the mass of liquid exiting the nozzle. It is also not critical for the purpose of this invention, whether the necessary signal processing of the vibrational signals is done on the platform adjacent to the injection nozzle, or done in the control room, or distributed between them.

This invention describes a generic method for measuring liquid flow in a two phase nozzle where the gas flow is controlled by a restriction orifice. The nozzles used for injecting oil into fluidized catalytic cracking units (FCC units) are of particular importance and will be used for examples in this invention. For these nozzles, the gas is steam, and the liquid is oil. It has been found that the vibrational power generated by gas flow through the RO is concentrated in frequency bands as clusters of peaks of vibrational power.

It is critical for the purpose of this invention, that field calibration be used to identify peaks and associated regions of the Power Spectrum whose area (or mean square vibrational power) is a strong function of the acoustic noise generated by gas flow through the RO. In what follows, these peaks are denoted as GAS FLOW PEAKS (GFP). In this invention, the measure of the vibrational power in the frequency band that includes the GAS FLOW PEAKS will be the RMS Acceleration (or Pressure) which is defined by the square root of the area of the power spectral density over a frequency band that includes the GAS FLOW PEAKS. This area will be designated as the AGFP and has the units of RMS acceleration (or pressure). It has been discovered that the AGFP is inversely correlated with the volume of liquid flow. In many cases, the AGFP is an inverse linear function of the liquid flow rate, but for the purpose of this invention does not have to be. Establishing the correlation factor between the AGFP and liquid flow from the nozzle can either be done in a test facility where liquid can be measured directly or by field calibration as described later. Below the gas flow peaks on the frequency spectrum are liquid flow peaks which are primarily responsive to liquid flow through the nozzle. These liquid flow peaks are not relevant to the present invention.

FIG. 2e shows the time varying signal from a vibrational sensor (accelerometer or dynamic pressure). FIG. 2f shows a plot of the power spectral density of such a transducer. The peak between frequencies F1 and F2 is meant to represent the GFP. The area under the Power Spectral Density curve between frequencies F1 and F2 is the AGFP. This area is equal to the mean square power of the vibrational sensor in the frequency band between F1 and F2.

Once the Gas Flow Peak (GFP) has been identified through its dependence on liquid flow, the AGFP can be determined in a variety of ways. One approach has been described above based on a digital signal processor. There are other ways which may be sometimes convenient. For example, the original vibrational signal shown in FIG. 2e can be passed through a filter which strongly attenuates vibrational energy at frequencies below F1 and above F2. Such a filter is known as a digital or analog "band-pass" filter. If the vibrational signal shown for FIG. 2e is passed through such a filter, the output is a different vibrational signal as illustrated in FIG. 2g. The signal shown in FIG. 2g only has a finite Power Spectral Density between F1 and F2 as shown in FIG. 2h. The time varying signal of FIG. 2g can be squared in a suitable electronic device and average (rectified and filtered) to give a dc signal that is proportional to the AGFP that was illustrated in FIG. 2h.

The Gas Flow Peaks (GFP) are usually found above 3000 Hz with an amplitude that dominates the spectrum in this range. FIG. 3 shows the vibrational power spectrum from an accelerometer mounted on the "rodding plug" of a working feed nozzle at the low end of the frequency spectrum are peaks due to liquid flow (oil). The Gas Flow Peaks (GFP) are found for this nozzle in the frequency range between 3000 and 12,000 Hz.

Figure 4A:
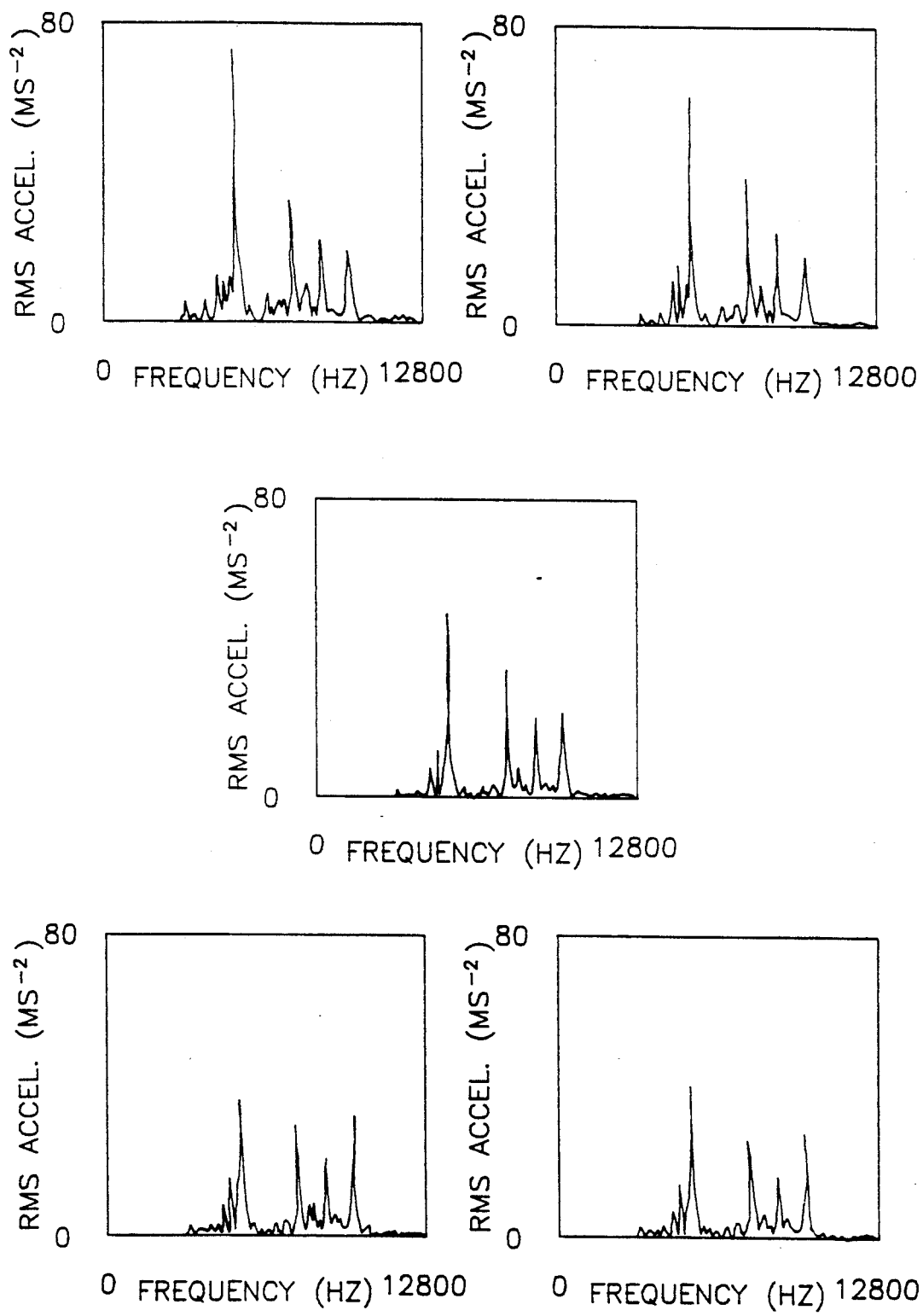
FIG. 4a shows a suite of RMS Acceleration spectra (0–12.8 kHz) from an catalytic cracking feed nozzle. The vibrational data was taken from an accelerometer on the face of the flange holding the restriction orifice (RO) at Location 25 of FIG. 1D. In this configuration, the gas flow (steam) peaks dominate the power spectrum. The decrease in gas/steam/peaks with increasing oil flow is apparent

FIG. 4a presents a series of RMS acceleration spectra over the frequency range 0–12.8 kHz that are obtained from an accelerometer mounted on the face of the flange holding the RO supplying steam to a specific feed nozzle (Location 27 of FIG. 1D). In this case peaks caused by liquid flow are negligible with respect to the GFP in the region which extends from 0 to 12,800 Hz.

Figure 4B:
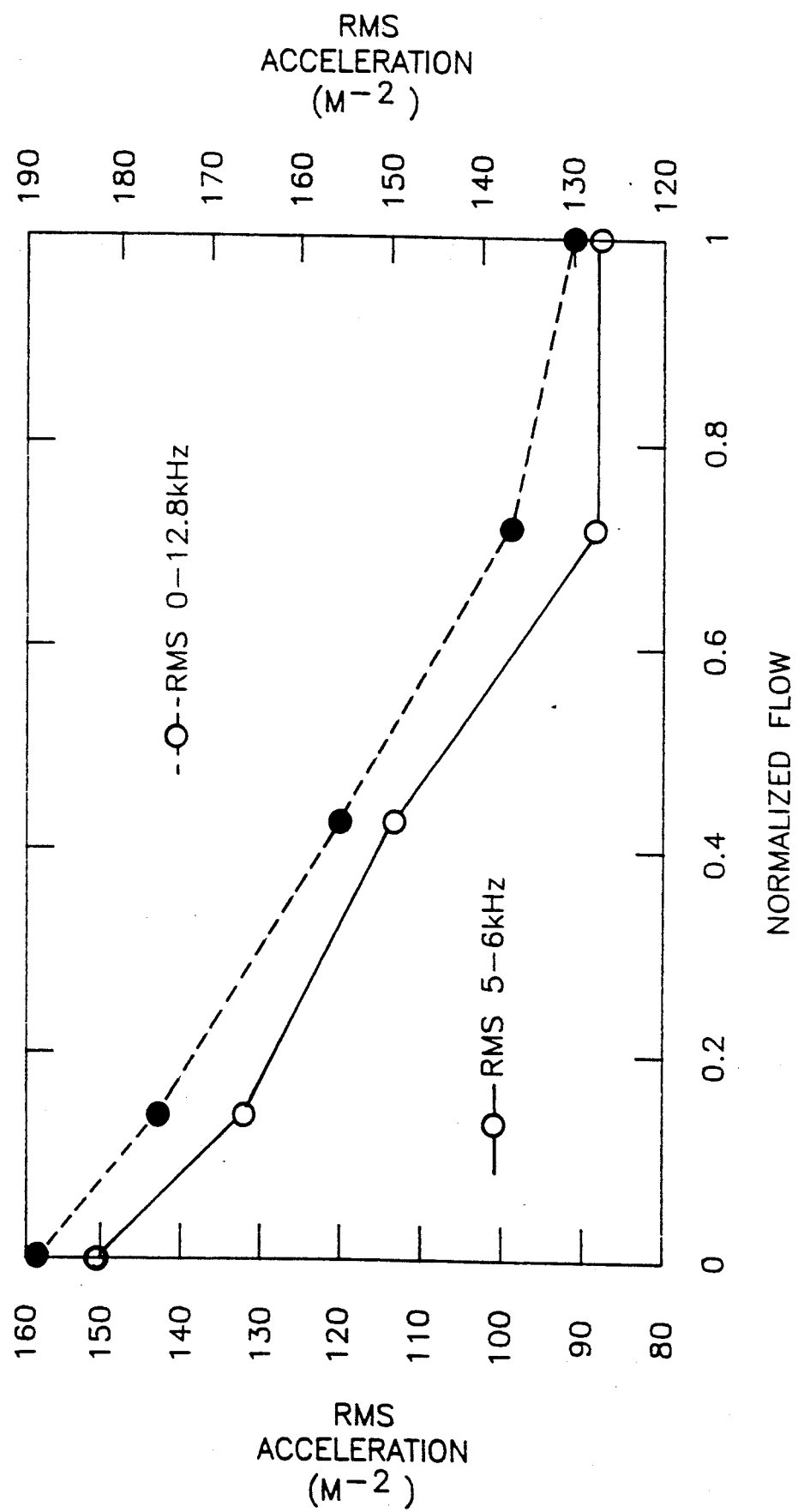
FIG. 4b shows the RMS Acceleration (AGFP) taken from the area Power Spectral Density over the band 0–12.8k Hz and over the band of the dominant gas "flow" peaks (5–6 kHz) as a function of the oil flow for this nozzle.

The decrease in the gas peaks with increasing oil flow is apparent. FIG. 4b demonstrates the inverse correlation between the GFP and liquid flow for two measures of the flow: the area of the power spectrum in the range 0–12.8 kHz and the area of the power spectral density between 5 kHz and 6 kHz. Either measure of the acoustic noise generated by gas flow through the RO is sufficient to monitor the liquid flow. As demonstrated, the frequency range of the power spectrum density may include only a single dominant peak or a series of peaks. In this figure the flow has been estimated from changes in the pressure of the manifold as the block valve controlling the nozzle was changed from full open to full closed under conditions where the oil flow to the manifold was held constant. Under these conditions, the oil flow to the nozzle, as its block valve is changed from full open to full closed, is inversely proportional to the manifold pressure. Measurement of the manifold pressure then permits measurement of the normalized flow. Measurement of the absolute liquid mass (or volume) flow in gallons per minute to the nozzle in question requires a separate calibration, or measurement of the AGFP under constant manifold pressure conditions where changes in manifold flow are measured separately.

FIGS. 5a and 5b show a similar set of vibrational data for another feed nozzle type where the flow was measured directly by measuring the change in oil flow to the manifold when the block valve controlling the nozzle was changed from full open to full closed. In FIG. 5b the RMS acceleration (AGFP) is taken over the frequency band of 0–15,000 Hz.

The strong inverse correlation of the acoustic noise signal with liquid flow from the nozzle is shown in FIGS. 4b and 5b is also shown in FIG. 6a and 6b for accelerometer placed on either the "rodding Plug" (Location 26 of FIG. 1d) or the edge of the flange holding the RO of a specific feed nozzles on FCC unit (Location 19 of FIG. 1d). The inverse correlation (but not the linearity of the AGFP with flow liquid shown in FIGS. 5B, 6A and 6B) can be made plausible by noting that decreasing (increasing) oil flow leads to an increasing (decreasing) pressure drop across the RO. The increasing (decreasing) pressure drop across the RO corresponds in turn to increasing (decreasing) vibrational power. The essentially linear variation of the signal is surprising, but is often a feature of the data as shown in FIGS. 4b, 5b, and 6a.

The present invention is a method to measure and monitor liquid flow from measurements of the vibrational power within the gas exiting the Restriction Orifice (RO) of the gas feed to a nozzle or from the solid borne sound generated by the vibrational power. The following discussion presents a plausible explanation as to why the method described in this invention can be used to measure liquid flow. However, it is to be understood that the invention is not limited by this description.

Figure 7C:
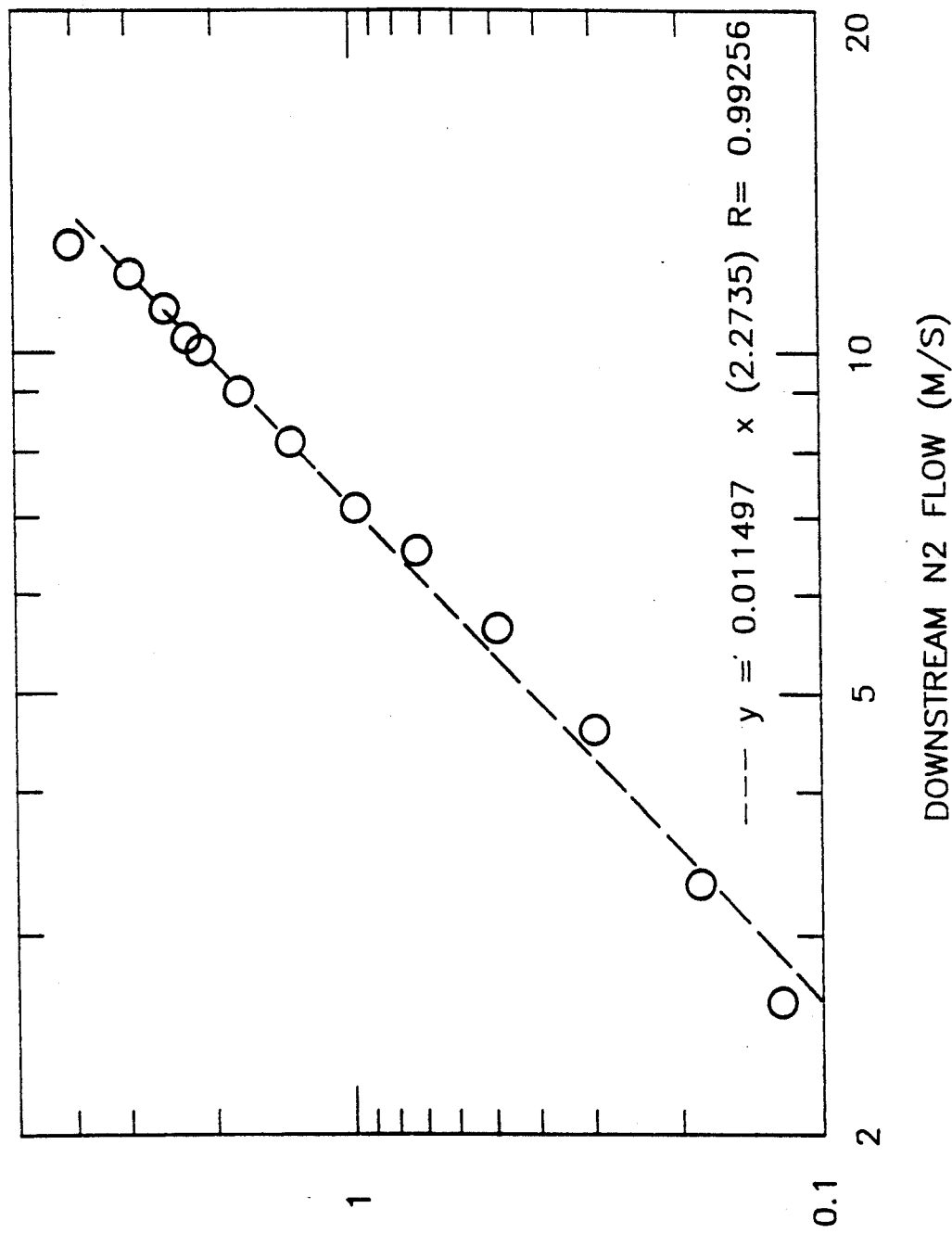
FIG. 7c shows the RMS acceleration taken from the Power Spectrum of an accelerometer on the RO over the band 1–17 kHz as a function of gas velocity downstream of the RO in meters per second (M/S).

The gas flow peaks shown in the proceeding Power Spectra are presumably produced by turbulence and acoustic shocks generated by the flow of the steam through the RO. That sound energy should be produced by the flow through the RO is not surprising since the pressure drop across the RO is usually designed to be that for "critical flow" where the flow velocity of the gas approaches that of the velocity of sound ("choke flow"). Under these conditions the mass flow through the RO is relatively independent of the downstream RO pressure drop as shown in FIG. 7a. FIG. 7a shows the results of laboratory measurements of the mass flow of nitrogen through a RO as a function of the pressure drop across the RO for fixed upstream pressure. However, while the gas mass flow is relatively insensitive to the pressure drop (FIG. 7a), the acoustic power, generated by the gas flow through the RO and which is picked up as solid borne sound by an accelerometer or gas pressure fluctuations, is a strong and continuous function of the molar flow across the RO as shown in FIG. 7b. As shown in FIG. 7c, the RMS acceleration varies as the square of the downstream gas velocity. It is important to note from FIG. 7b, and 7c that the RMS acceleration starts increasing well below critical flow. FIG. 7c shows the strong correlation of the of the AGFP with the gas velocity downstream of the RO under such "near critical" flow conditions. FIG. 7d shows the equally strong correlation with the pressure drop across the RO and the RMS acceleration.

The strong dependence of the flow acoustic power and hence the solid borne sound that is coupled to it on pressure drop or downstream flow velocity can be appreciated by elementary considerations if it is assumed that the power is generated by fluctuating pressure within the RO. From standard texts, the acoustic power generated by a fluctuating pressure source at the RO is given by the product of the kinetic energy flux to the RO[$\rho V^3$], where V is the velocity of the flow, and $\rho$ is the density of the gas] and the acoustic efficiency of sound generation by fluctuating pressure which is given by [$(V/C_s)^3$] where $C_s$ the velocity of sound of the gas. Thus, it is anticipated, for this mechanism, that the AGP {RMS Acceleration (or Pressure)} would vary as $$AGP \sim \left( \rho V \times V^2 \times \left( \frac{V}{C_s} \right)^3 \right)^{\frac{1}{2}}$$

Under conditions of choke flow, $\rho V \simeq$ constant, and the RMS Acceleration (or Pressure) will depend on gas velocity as $V^{2.5}$, in approximate agreement with what is observed in laboratory tests as shown in FIG. 7c (AGFP=RMS Acceleration$\simeq V^{2.3}$).

Simple acoustic considerations can approximately account for the rapid increase in the intensity of the AGFP with increasing pressure drop across the RO. Of course when the oil flow is reduced to a nozzle, the pressure drop across the nozzle decreases and this increases the pressure drop across the RO. The dominant feature of AGFP, namely its inverse dependence on oil flow can be understood, but not of course the dynamic range of the AGFP, or the fact that it dominates the vibrational power generated at the RO in the frequency band corresponding to the Gas Flow Peaks.

The frequency of the gas flow peaks (=$F_G$) may also be accounted for by elementary calculations. One candidate is the frequency of vortex shedding by the RO itself. From elementary acoustic, the frequency of the Gas Peaks, $F_G$, due to vortex shedding by an object of size "L" in a flow of velocity FV is given by $$F_G = \left( \frac{V}{2c} \right)$$

{*Elementary Mechanics of Fluids*, Hunter Rouse (Dover N.Y., 1978) p. 241}

Substituting for V, the velocity of sound of steam (500 ms$^{-1}$), and for L, the aperture of an RO, (0.2"), $F_G \simeq$20,000 Hz, only slightly above the range of the vapor peaks shown in FIG. 3.

Another physical mechanism for the frequency band of the gas peaks might be vibrational modes, excited in the gas within typical piping leading from the RO. Under these circumstances, elementary calculations suggest $$F_G = \left( \frac{C_s}{2D} \right)$$

where $C_s$ is the velocity of sound in the steam and D is the diameter of the pipe. For D 1-2", $C_s$=500 ms$^{-1}$, $F_s$ $F_m$ 5000-10,000 Hz, i.e, within a factor of two of the observed frequency range of the vapor peaks.

The vibrational signal from either an accelerometer or a dynamic pressure transducer is a sensitive and robust monitor of liquid flow under the extreme conditions found in petroleum processing. Calibration of the vibrational signal to flow can be accomplished in any number of ways.

It is clear that if separate liquid flow measurements are made, a correlation between the AGP and the liquid flow rate can be obtained. Subsequent measurements of the AGFP can then be used to monitor and measure the oil flow from individual injection nozzles and optimize the refining or petrochemical process with respect to the flow distribution. Blocked or partially blocked feed nozzles can be identified and corrective actions taken.

In a plant environment the GFP can be identified by changing the oil block valve ((12) FIG. 1C) in steps from fully closed to fully open and identifying the peaks in the power spectrum that change. The correlation coefficient between the AGFP and liquid flow can then be determined by measuring the change in oil flow to the manifold when the block valve of a specific nozzle is changed, and ensuring that the pressure in the manifold is kept constant. Under these circumstances, it can be assumed that the flow out of the other nozzles is unchanged and any change in the manifold flow is equal to the change in the flow to the nozzle in question. This is the technique that was used to obtain FIGS. 5a and 5b and FIG. 6a and 6b.

An alternative way of calibrating the method of this invention under conditions when the oil flow to the manifold is held constant. Under these circumstances, the change in oil flow to no nozzle with the change in the block valve is approximately proportional to the change in pressure. Changes in relative flow for an individual nozzle can be directly determined by this procedure. However, absolute changes in the oil flow can only be determined if the change in flow to the manifold is measured, as discussed earlier, or if the flow to the nozzle in question is measured directly.

Figure 8A:
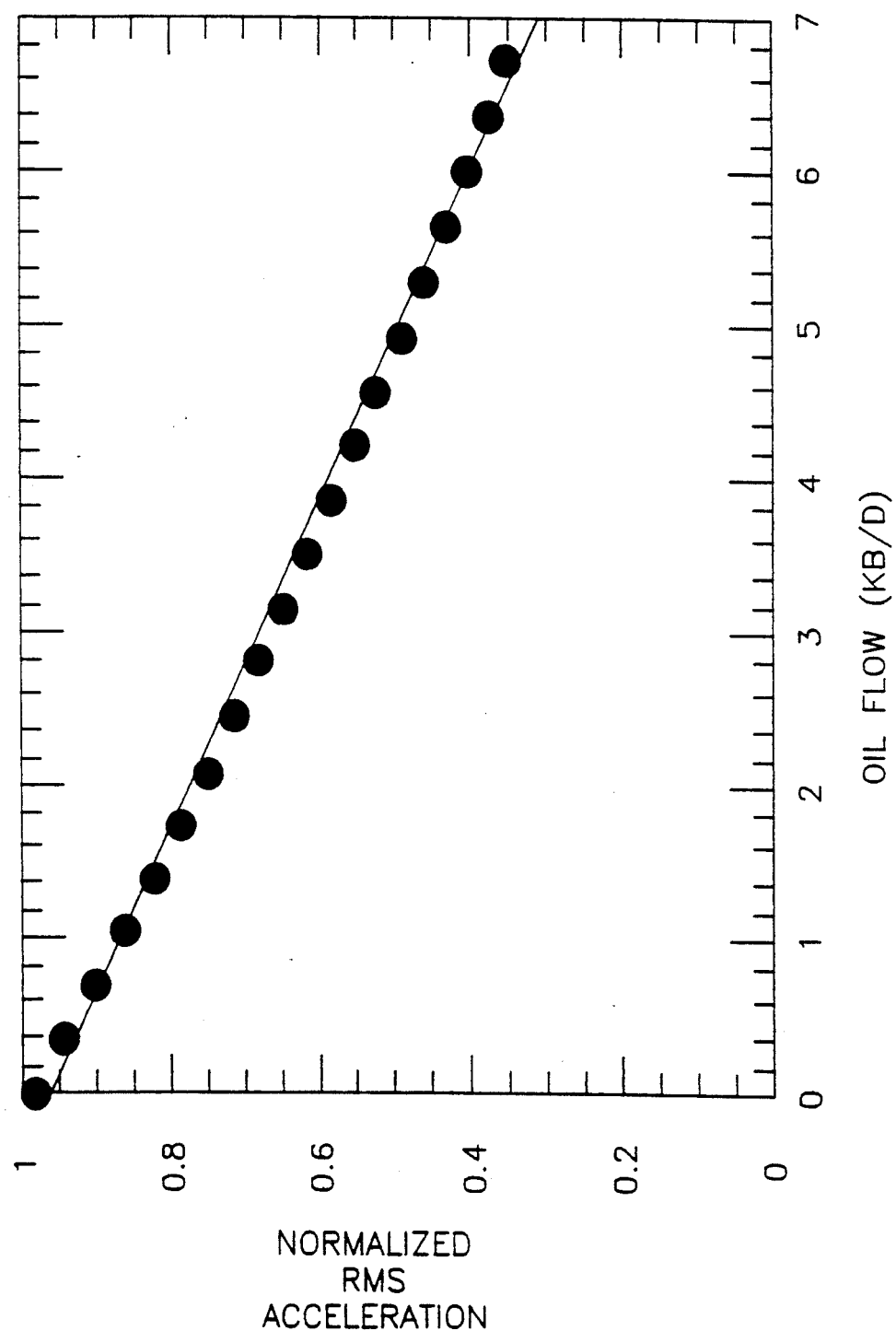
FIG. 8a shows the predicted normalized vibrational signal from an accelerometer in contact with a RO as a function of oil flow derived from laboratory experiments of FIGS. 7a, 7b, 7c and 7d and flow model for the feed nozzle.
Figure 8B:
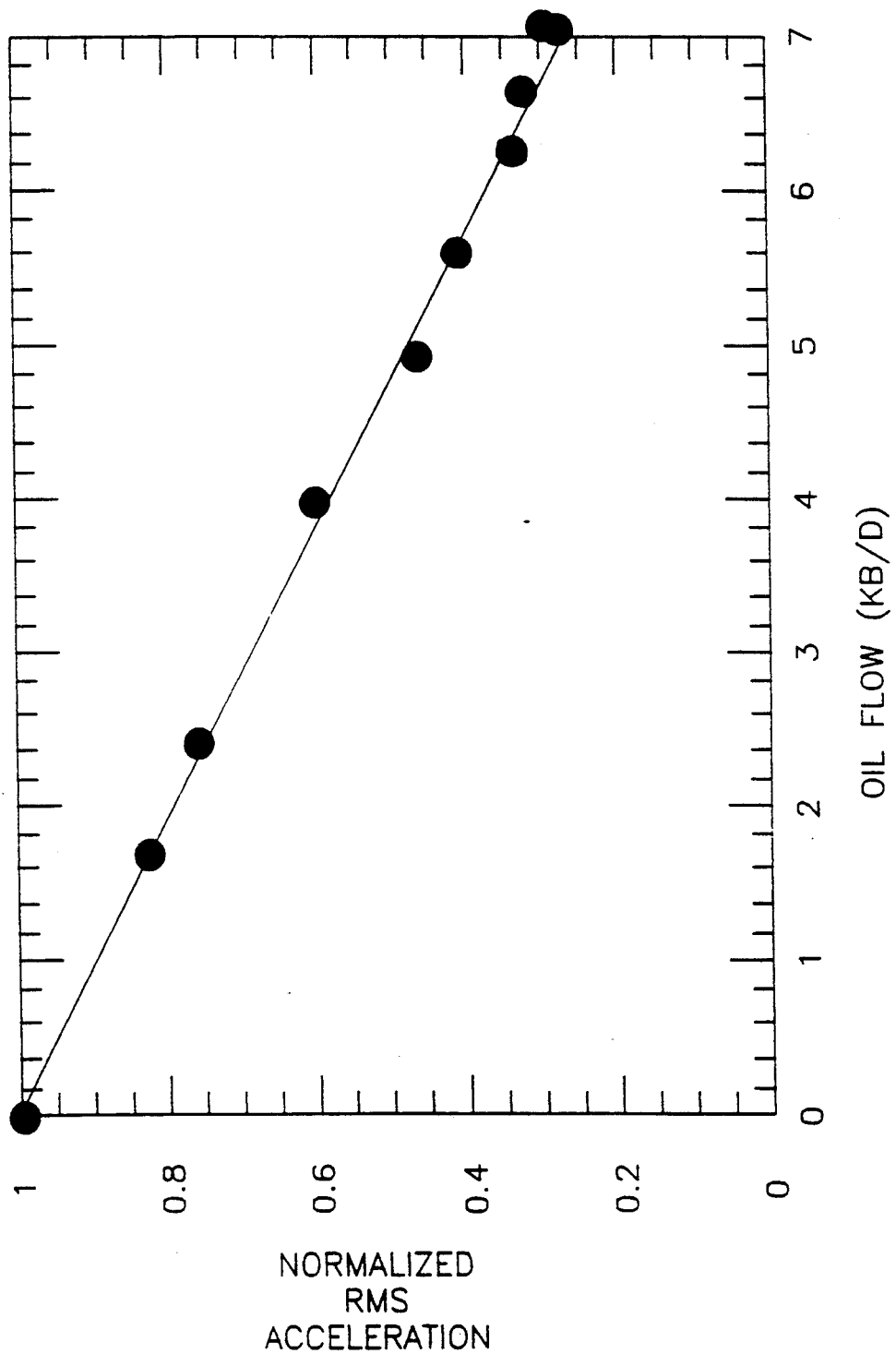
FIG. 8b shows the measured normalized vibrational signal as a function of oil flow measured in on a working cat-cracking feed nozzle.

Oil flow to an individual nozzle injecting a mixture of oil and steam into a catalytic cracking unit was varied by changes in the block valve setting of the nozzle. Oil flow to the individual nozzle was measured under these conditions by ensuring that the pressure in the manifold remained constant, and by measuring the change in oil flow to the manifold. As shown in FIG. 5b, the RMS acceleration, AGFP, over 0-15,000 Hz band obtained from an accelerometer in contact with the edge of the flange holding the RO, is a linear function of the oil flow through the nozzles in question. As shown in FIG. 6a, somewhat lesser sensitivity is shown when the vibrational signal is obtained from an accelerometer in contact with the rodding plug of the nozzle. In both cases the RMS acceleration in the band falls as the oil flow increases. The simulated laboratory measurement of the vibrational signal as a function of oil flow under the similar circumstances, is shown in FIG. 8a, and is in excellent agreement with the observations made under field conditions (FIG. 8b). Changes in the absolute value of the oil flow through the particular nozzle in question would be conveniently and non-intrusively made by measuring changes in the RMS acceleration of the accelerometer over the full band.

An example of the constant manifold flow technique is shown in FIGS. 4a and 4b. An accelerometer was mounted on the face of the flange holding the RO on a different set of nozzles from those examined in FIGS. 5a and 5b or FIGS. 6a and 6b. In this case the oil flow to the manifold was kept constant and the pressure to the manifold changed as the block valve was closed. FIG. 4b shows the change in the RMS Acceleration of the AGFP as a function of normalized flow for two bandwidths: 0–12.8 kHz which includes a multitude of peaks as shown in FIG. 4a and 5–6 kHz which includes the dominant peak in the power spectrum. The AGFP exhibits a linear variation with flow. In this example, and as noted, a separate calibration has to be made to convert the normalized to absolute flow.

Figure 9A:
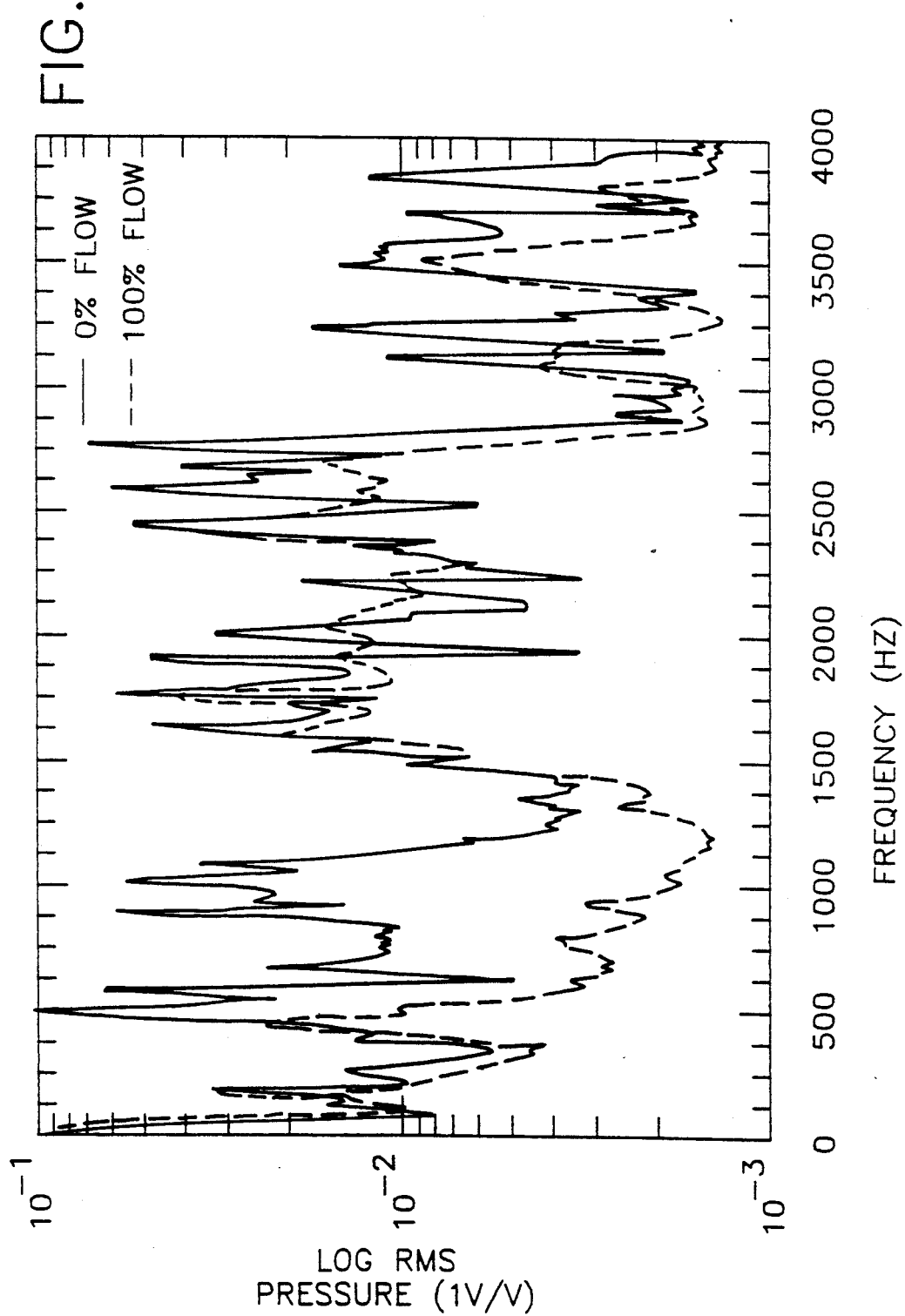
FIG. 9a shows the logarithm of the RMS pressure spectrum from a dynamic pressure transducer in the rodding plug of an operating two phase feed nozzle over the range 0–400 Hz under two flow conditions: 0% flow and 100% flow.
Figure 9B:
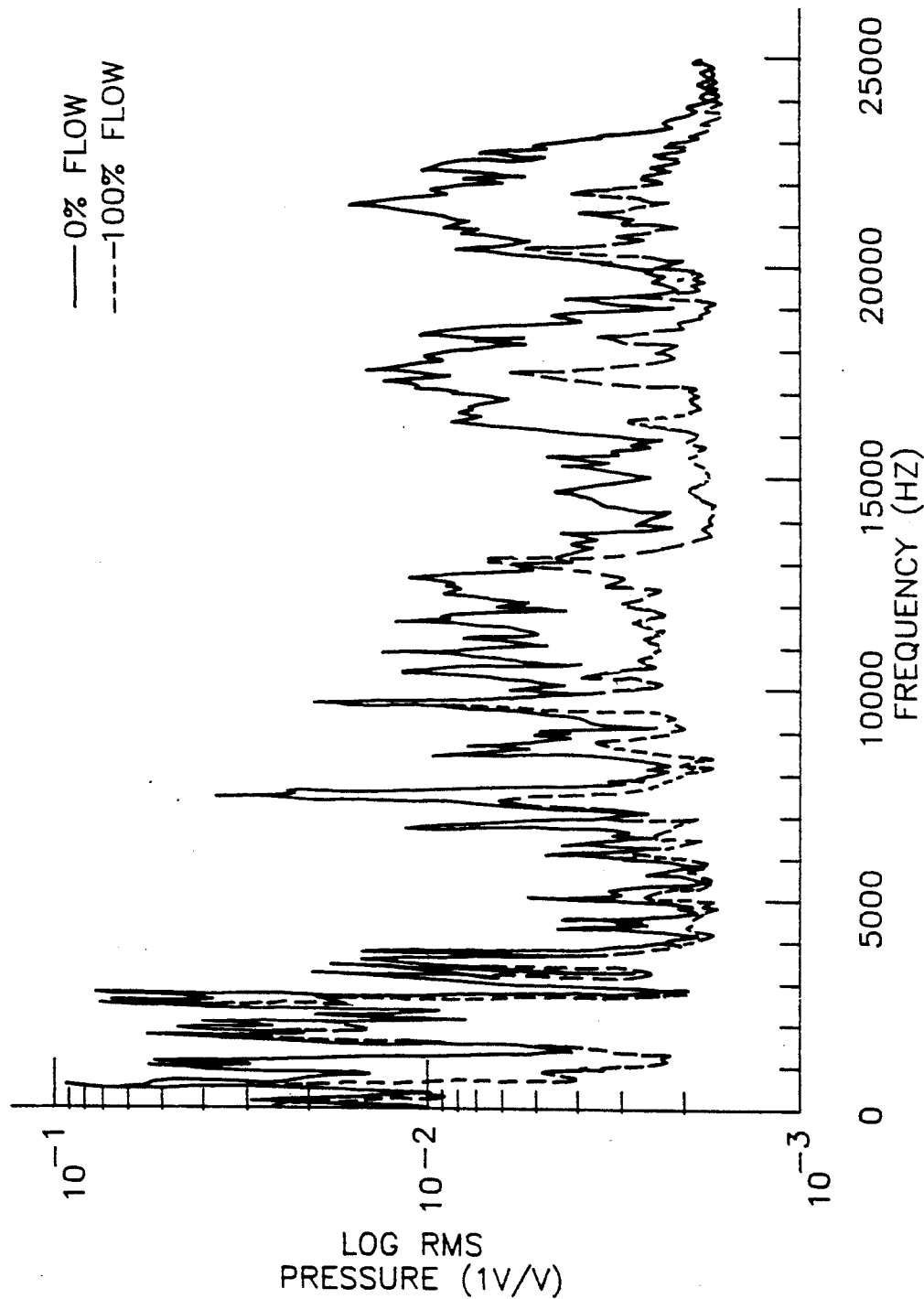
FIG. 9b shows the logarithm of the RMS acceleration spectrum from a dynamic pressure transducer in the rodding plug of the operating two phase feed nozzle whose RMS pressure spectrum is shown in FIG. 9a over the range 0–25,000 Hz under two flow conditions: 0% flow and 100% flow.

FIG. 9a shows the a plot of the Power Spectral Density of the output of a dynamic pressure transducer inserted in the rodding plug of a feed nozzle under two conditions of flow, 0% and 100% flow, over 0–4000 Hz. There is a large reduction in the dynamic pressure signal between 500 and 1400 Hz for 100% flow. The RMS Pressure over the range 0–4000 Hz for 100% flow is 70% of its value at 0% flow. FIG. 9b shows Power Spectral Density of the same dynamic pressure data over a broader frequency range, again there are large differences between the RMS pressure for 0% flow and 100% flow. The calibration of the pressure signal with respect to oil flow would be accomplished as in the two proceeding examples.

What is claimed is:

1. A method for measuring the mass flow rate of liquid flow into a two-phase liquid/gas injection nozzle comprising:
   (a) determining the power spectral density from a signal from a vibrational sensor in close proximity to said nozzle over a frequency band which includes a series of gas flow peaks, where the area of the power spectral density of said gas flow peaks has a monotonically decreasing relationship with respect to the liquid flow through said nozzle;
   (b) determining the magnitude of the area of said power spectral density including at least one of said gas flow peaks;
   (c) determining the mass of liquid flow through said nozzle from a correlation between different magnitudes of said area of said power spectral density including said gas flow peaks and the mass flow rate of liquid flow for said nozzle.

2. The method of claim 1 wherein said vibrational sensor is an accelerometer.

3. The method of claim 1 wherein said vibrational sensor is a pressure transducer in contact with said liquid/gas in said nozzle.

4. The method of claim 1 wherein said power spectral frequency band extends from 0–25,000 Hz.

5. The method of claim 1 wherein said area that is determined in steps (b) and (c) only includes the gas flow peaks.

6. The method of claim 1 wherein said area that is determined in steps (b) and (c) only includes only the dominant gas flow peak.

7. The method of claim 1 wherein a band pass filtered portion of the signal from said sensor is used to directly determine area of the gas flow peak.

8. The method of claim 1 where processing of the vibrational signal is performed adjacent to each nozzle.

9. The method of claim 1 wherein all determinations are carried out using the square root of the area so that said monotonically decreasing relationship is approximately a straight line.

* * * * *